United States Patent [19]
Katagiri

[11] Patent Number: 5,422,695
[45] Date of Patent: Jun. 6, 1995

[54] CAMERA

[75] Inventor: Moriya Katagiri, Hachioji, Japan

[73] Assignee: Olympis Optical Co., Ltd., Tokyo, Japan

[21] Appl. No.: 112,251

[22] Filed: Aug. 25, 1993

[30] Foreign Application Priority Data

Aug. 25, 1992 [JP] Japan .................. 4-226018
Sep. 14, 1992 [JP] Japan .................. 4-245249
Sep. 14, 1992 [JP] Japan .................. 4-245253

[51] Int. Cl.⁶ .......................... G03B 1/18; G03B 1/00
[52] U.S. Cl. .................... 354/173.1; 354/212
[58] Field of Search ............. 354/173.1, 288, 214, 354/212, 275, 170

[56] References Cited

U.S. PATENT DOCUMENTS

| | | | |
|---|---|---|---|
| 4,332,453 | 6/1982 | Seely et al. | 354/212 X |
| 4,363,547 | 12/1982 | Hashimoto et al. | 354/212 |
| 4,610,522 | 9/1986 | Tobioka et al. | 354/173.1 |
| 4,841,319 | 6/1989 | Hansen | 354/212 X |
| 4,860,041 | 8/1989 | Harvey | 354/212 |
| 5,105,211 | 4/1992 | Kameyama | 354/173.1 |

FOREIGN PATENT DOCUMENTS

| | | |
|---|---|---|
| 2-96734 | 4/1990 | Japan . |
| 2-170156 | 6/1990 | Japan . |
| 2-114248 | 8/1990 | Japan . |
| 2-195335 | 8/1990 | Japan . |
| 3-84531 | 4/1991 | Japan . |

Primary Examiner—M. L. Gellner
Assistant Examiner—Nicholas J. Tuccillo
Attorney, Agent, or Firm—Louis Weinstein

[57] ABSTRACT

A camera, in which film is pulled out of a Patrone which is mounted according to a drop-in procedure and then taken up by a spool, comprises a spool for taking up film, and a pull-out sheet that has one end fixed to the spool and the other end passing over a rear side of an aperture and fitted to a film, and that pulls out the film and winds it about the spool. When the pull-out sheet is located at an initial position at which the other end thereof extends over a rear side of the aperture, light passing through an optical system passes through at least a portion of the pull-out sheet. A film feed driving clutch is interlocked with the opening and closing of the Patrone cover.

26 Claims, 18 Drawing Sheets

CAMERA

BACKGROUND OF THE INVENTION

1. Field of the Invention

The present invention relates to a camera, and more particularly, a film loading structure using a Patrone.

2. Description of the Related Art

A camera disclosed in Japanese Patent Laid-Open No.3-84531 or No.2-170156 is a so-called drop-in feed type camera in which a Patrone is dropped in the camera to load film. The camera includes a technological means into which a belt-like sheet, whose one end is fixed to a spool, is passed over an aperture and extends to a Patrone chamber, the distal part of the sheet engages the film, and then the film is pulled out of a Patrone and wound on the spool.

In general, various kinds of regulation are required in the process of constructing a camera: that is, lens focusing or exposure compensation.

Lens focusing is intended to regulate the position of a lens so that the lens will be in focus on a film surface. In a well-known method of lens focusing, a photoelectric collimator is used as a regulator and a mirror of the regulator is set at a position on the film surface. On the other hand, exposure compensation is intended to correct a photometric error or an exposure error for a shutter. In a well-known method of exposure compensation, a light receiver of a regulator is set at a position on a film surface.

In a conventional camera proposed in Japanese Patent Laid-Open No.3-84531 or 2-170156, the foregoing regulation cannot be achieved because a pull-out sheet interferes with the mirror or light receiver of a regulator. Before and after the regulation, excessive work is required respectively to take up the pull-out sheet using a spool and pull it out.

Proposals have been made for a structure for mounting a Patrone or feeding film in a drop-in feed type camera. The drop-in feed type camera has been disclosed in Japanese Patent Laid-Open Nos.2-96734, 2-114248, and 2-195335. In these disclosures, when a Patrone is mounted according to a drop-in procedure, auto-loading is achieved; that is, film is automatically passed over an aperture opening and fed to a spool.

The structure proposed in the Japanese Patent Laid-Open No.2-96734 is designed for a camera including a simplified mounting mechanism responsible for all processes from mounting of a Patrone to film loading. This camera includes a movable Patrone cover in which a Patrone is stowed, and a back cover for shielding the other part of the back of the camera except the Patrone cover. The back cover is united with a camera body.

The structure proposed in the Japanese Patent Laid-Open No.2-114248 is designed for a camera in which when a cartridge containing film is mounted in a cartridge chamber corresponding to a Patrone chamber, a specified amount of film is fed into a spool chamber and then loading is terminated. In this camera, a cover supported with an axis by the bottom of a camera is opened to mount the cartridge.

The structure proposed in the Japanese Patent Laid-Open No.2-195335 is designed for a camera in which when a cartridge containing film is mounted in a cartridge chamber corresponding to a Patrone chamber, a specified amount of film is fed to a spool chamber by means of an initial feed mechanism. In this camera, a door of the cartridge chamber, which is supported with an axis by the back of the camera, is opened to mount the cartridge.

In the camera disclosed in the Japanese Patent Laid-Open No.2-96734, a Patrone cover is opposed only to a Patrone chamber and an aperture is blocked with the back cover of the camera. The back cover is united with a camera body. Lens focusing, exposure compensation, that is, photometric exposure compensation, or other regulation, which is required in the process of constructing a camera and in which a regulation jig is set at an aperture rail in an aperture opening corresponding to a film surface, is impossible to perform on a finished product of a camera.

Furthermore, if film feed is repeated, shavings of film adhere to film rails laid on edges of an aperture. Nevertheless, since the back cover of the aperture cannot be opened, the shavings cannot be removed.

By the way, the Japanese Patent Laid-Open Nos.2-114248 and 2-195335 have not described the back cover of an aperture. No consideration has been taken into the regulation to be performed by setting a regulation jig at the aforesaid aperture rail or the cleaning of the aperture rail.

The camera disclosed in the Japanese Patent Laid-Open No.2-114248 has a structure in which a Patrone is dropped in from the bottom of the camera. A film wind and rewind gear array is arranged in the upper part of the camera body in terms of the positional relationship with the driving mechanisms for the gear array.

The gear array obstructs the arrangement of an auto-focusing unit, a viewfinder, a strobe, and other various units, which leads to an increase in the scale of a camera. In efforts to solve the aforesaid problems, if the gear array is arranged in the lower part of a camera and the Patrone cover is situated in the upper part of the camera, the parting line of the cover becomes visible from above. This impairs the appearance of a camera.

The camera disclosed in the Japanese Patent Laid-Open No.2-195335 is of the type that a Patrone is mounted from the side of the camera. The publication however does not clarify a means or structure for driving a spool of a Patrone for rewinding film. Assuming that a conventionally known rewind fork mechanism, which projects into a Patrone chamber, is employed, the disclosed method of mounting a Patrone straight from the side of a camera cannot be adopted.

OBJECTS AND SUMMARY OF THE INVENTION

The first object of the present invention is to provide a camera that loads film over an aperture opening, and in which, despite a simple structure, regulation can be performed effortlessly in the process of assembling, and film loading can be achieved readily.

The second object of the present invention is to provide a camera that toads film over an aperture opening, and in which a Patrone can be mounted readily, an aperture and its surroundings can be cleaned easily, and various kinds of assembly regulation in an aperture opening can be achieved effortlessly.

The third object of the present invention is to provide a camera that loads film over an aperture opening, and in which a Patrone can be mounted readily and reliably, and a compact design with beautiful appearance can be enjoyed.

In one camera according to the present invention, light reaching the back of a camera body is metered to perform various kinds of regulation. The camera includes a film pull-out sheet that, when the camera is in the initial state, has one end thereof fixed to a take-up spool and the other end thereof extended to a Patrone chamber with an aperture between the ends thereof, and that, when film is to be wound, helps wind the film about the spool. The film take-out sheet transmits the light that has passed through the aperture to the back of the camera body.

In another camera according to the present invention, film is pulled out of a Patrone mounted in a Patrone opening in a camera body and then wound up. The camera includes an aperture opening blocking means for blocking and exposing an aperture opening, and a film pull-out sheet having one end thereof fixed to a take-up spool in the camera body and the other end held on to the aperture opening blocking means in a Patrone chamber so as to swing freely with the aperture opening between the ends thereof.

Another camera according to the present invention includes a Patrone cover that when a Patrone is mounted or demounted, opens or blocks a Patrone opening. The camera further includes a driving force transmission means that, is located in a camera body and winds or rewinds film, and a spool axis driving means that, when the Patrone cover is closed, couples the driving force transmission means to transmit driving force to a spool axis of a Patrone, and that, when the Patrone cover is opened, separates from the driving force transmission means so as to be decoupled from it.

Other features and advantages of the present invention will be fully apparent from the description below.

DETAILED DESCRIPTION OF THE PREFERRED EMBODIMENTS

Embodiments of the present invention will be described with reference to the drawings.

Figure 1:
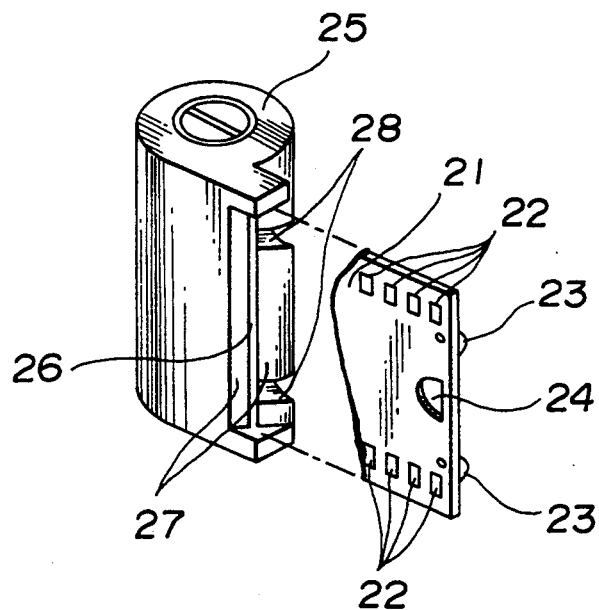
FIG. 1 is an oblique view of a Patrone adopted for a camera of a first embodiment of the present invention which will be described later.

FIG. 1 is an oblique view showing a Patrone adopted in a camera of the first embodiment of the present invention which will be described later.

In the Patrone, bosses 23 are implanted in the distal part of film 21, which has perforations 22 on both side edges thereof, as part of the film 21. The bosses 23 are fitted in notches 28 in a Patrone 25 to prevent the film 21 from being wound in. A fitting hole 24 is bored in the center of the distal part of the film 21. An inclined plane 27 is formed on the end surface of a film pull-out port 26 of the Patrone 25.

Figure 2:
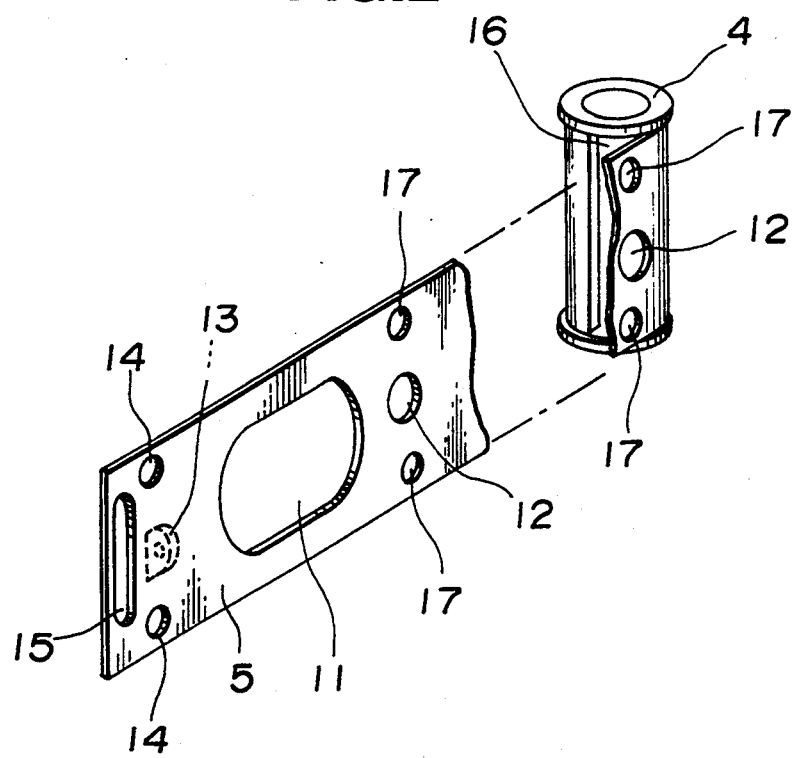
FIG. 2 is an oblique view of a spool and a take-out sheet employed for the camera of the first embodiment of the present invention.
Figure 3A:
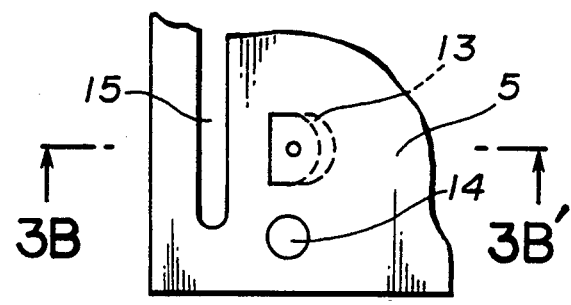
FIG. 3A is an enlarged view showing a distal part of a pull-out sheet in the camera of the first embodiment.
Figure 3B:
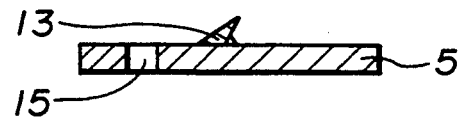
FIG. 3B is sectional view of the pull-out sheet of FIG. 3A looking in the direction of arrows 3B—3B'.

FIG. 2 is an oblique view showing a spool and a pull-out sheet employed for the camera of the first embodiment of the present invention. FIG. 3A is an enlarged front view showing the distal part of the pull-out sheet. FIG. 3B shows 3A—3A' section of FIG. 3A.

An elongated presser hole 15 Is bored in an area in the distal part of a pull-out sheet 5 coinciding with a sheet presser 35 (See FIGS. 6 and 8), which will be described later, or one end of a spring 36 attached to the inner wall of a camera body 1. A claw 13, which will be fitted into the fitting hole 24 in the film 21, is implanted in the pull-out sheet 5 by one side of the presser hole 15 closer to spool 4. Boss holes 14 are bored on opposite sides of the claw 13 to entrap the bosses 23 formed in the distal part of the film 21.

The proximal part of the pull-out sheet 5 is firmly wound about the spool 4. Boss holes 17 and a claw hole 12 are bored in the pull-out sheet 5 and a recess 16 is formed in the spool 4, so that when the pull-out sheet 5 is wound up about the spool 4, the bosses 23 on the film 21 and the claw 13 on the pull-out sheet 5 will be entrapped by them. Furthermore, a regulation hole 11 is bored in the portion of the pull-out sheet 5 corresponding to the center of an aperture 2 (See FIG. 4) of the camera.

Alternatively, the foregoing regulation hole 11 may not be bored but the pull-out sheet 5 may be made of a substantially transparent material that transmits 50% or more of visible light; such as, a cellulose triacetate film (CTA film) or a polyethylene terephthalate film (PET film).

Figure 4:
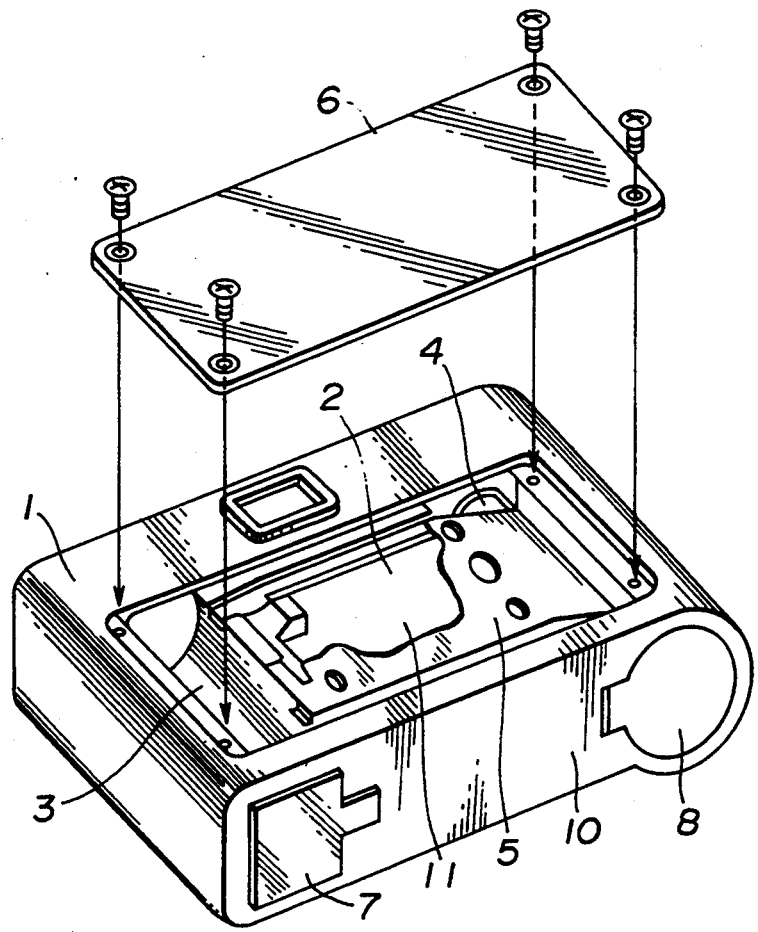
FIG. 4 is an oblique view showing the back of the camera of the first embodiment.

FIG. 4 is an oblique view showing the back of the camera of the first embodiment in a state in which the back cover is removed.

A Patrone chamber 3 is formed in the left-hand part of a camera body 1 in FIG. 4. The spool 4 is supported with an in the right-hand part of the camera. The aperture 2 opens in the center thereof.

The pull-out sheet 5 extends from the spool 4. The distal part of the pull-out sheet 5 is located in the Patrone chamber 3 and the regulation hole 11 is located behind the center of the aperture 2. The back cover 6 is attached to the camera body 1 and along the rear of the camera body 1 using screws. In FIG. 4, reference numerals 7 and 8 denote a Patrone cover and a battery cover respectively.

Figure 5:
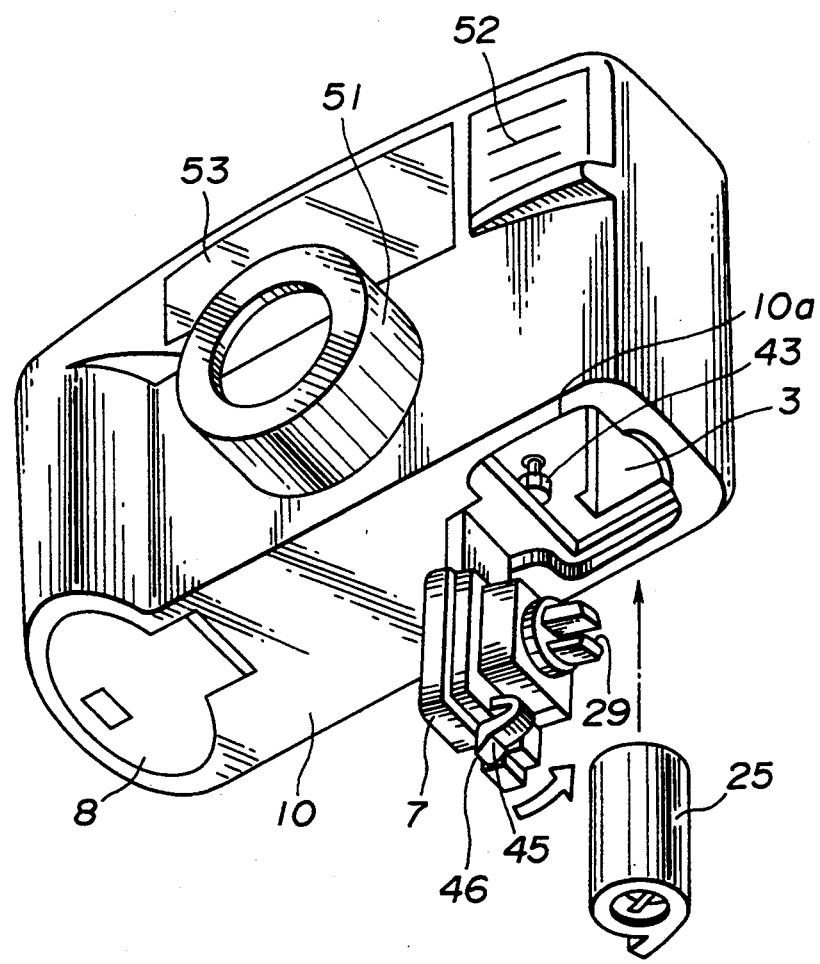
FIG. 5 is an oblique view showing the appearance of the camera of the first embodiment.

FIG. 5 shows the outer appearance of the camera of this embodiment. A lens barrel 51 is located in the center of the front surface of the camera. A viewfinder window (not in view), an auto-focusing window 53, and a strobe window 52 are arranged in the upper part of the camera. The battery cover 8 and Patrone cover 7 are formed on the bottom of the camera.

An open/close knob 46 is formed as part of the Patrone cover, wherein the open/close knob 46 has a lock claw 45 serving as a locking means for locking the Patrone cover 7, and is movable between a locking position at which the Patrone cover 7 is closed on a casing 10 and an unlocking position at which the Patrone cover is enabled to open.

Figure 6:
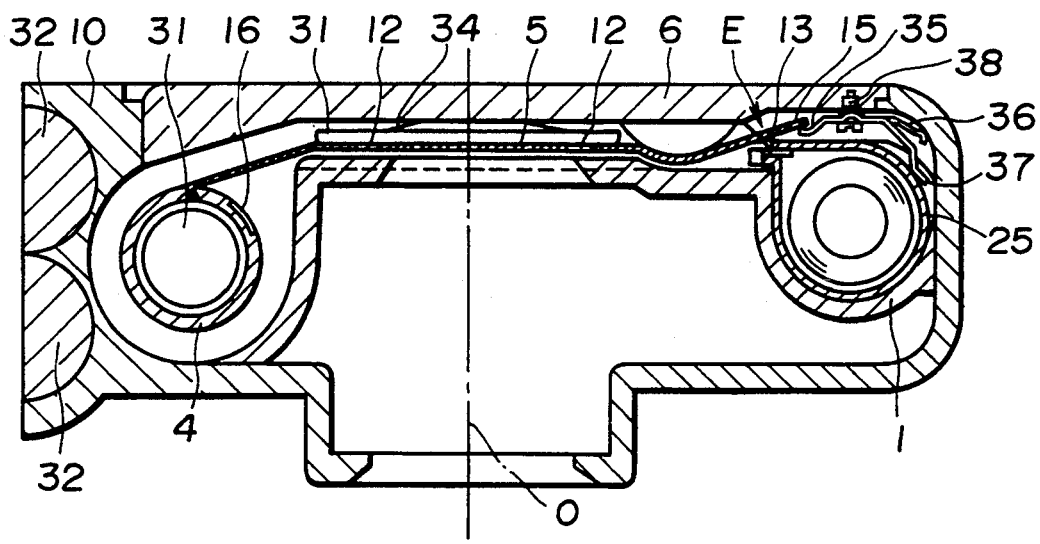
FIG. 6 is a cross-sectional view of a camera body of the camera of the first embodiment in a state that a Patrone is mounted.
Figure 7:
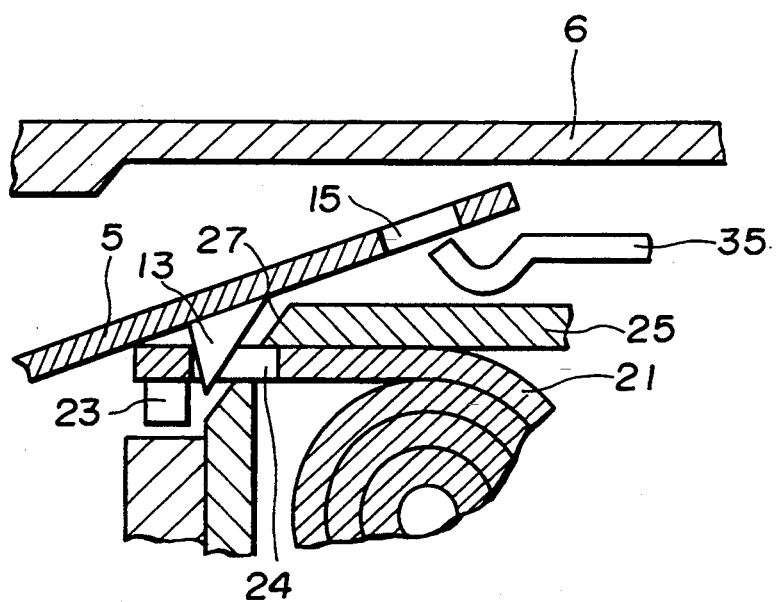
FIG. 7 is an enlarged view of an area E in FIG. 6.
Figure 8:
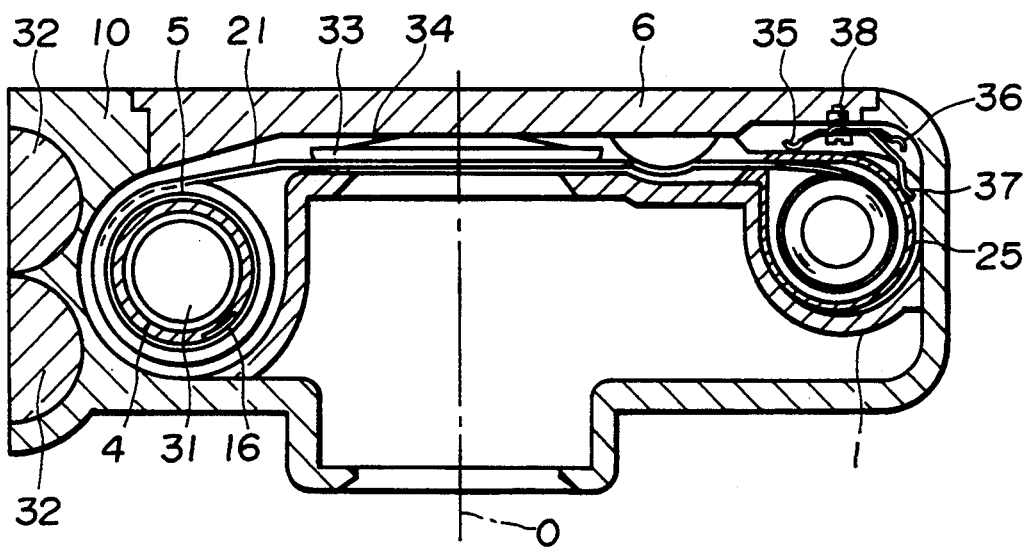
FIG. 8 is a cross-sectional view showing the camera body of the camera of the first embodiment in a state in which film is wound on and taken up by a spool.
Figure 9:
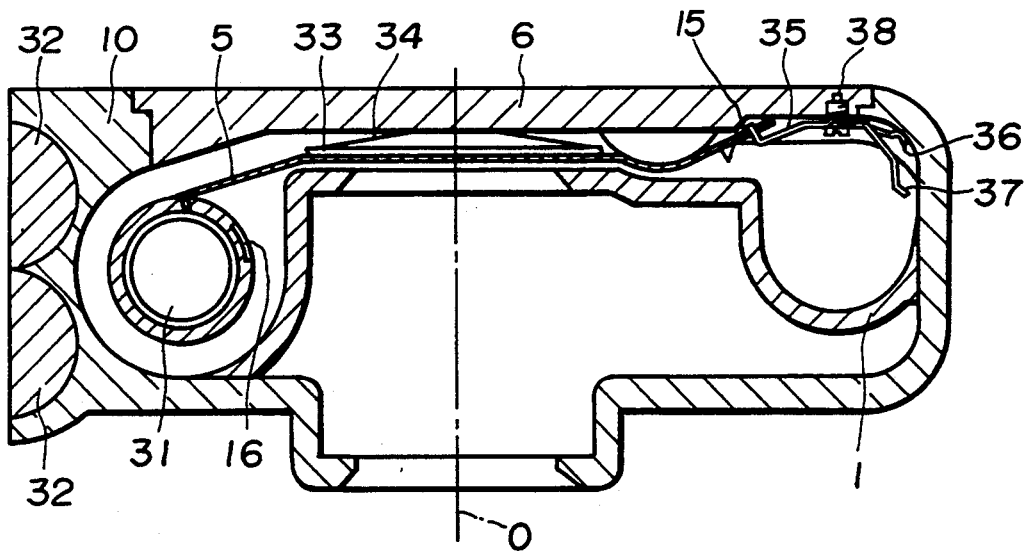
FIG. 9 is a cross-sectional view of the camera body of the first embodiment in a state in which a Patrone is demounted from the camera body.

FIGS. 6, 8, and 9 are cross-sectional views showing the camera body of the camera of the first embodiment. FIG. 6 shows the camera body in a state in which a Patrone is mounted. FIG. 8 shows the camera body in a state in which film is wound up and taken up by a spool. FIG. 9 shows the camera body in a state in which the Patrone is demounted from the camera body. FIG. 7 is an enlarged view of an area E of FIG. 6, showing an end of the pull-out sheet 5 and its surroundings.

A motor 31 is fixed to the camera body 1 (See FIG. 6). The spool 4 is supported with an axis by the camera body 1 and attached to the outer circumference of the motor 31 so that the spool 4 can rotate freely. A Patrone presser 37 is attached to the back cover 6 of the camera body 1 by means of a supporting pin 38 so that the Patrone presser 37 can swing freely. The Patrone presser 37 is made of an elastic metal plate, wherein a spring 36 and a sheet presser 35 are united with each other. The spring 36 is in contact with the inner wall of the back cover 6, constraining the Patrone presser 37 to turn clockwise in FIG. 6.

Figure 10:
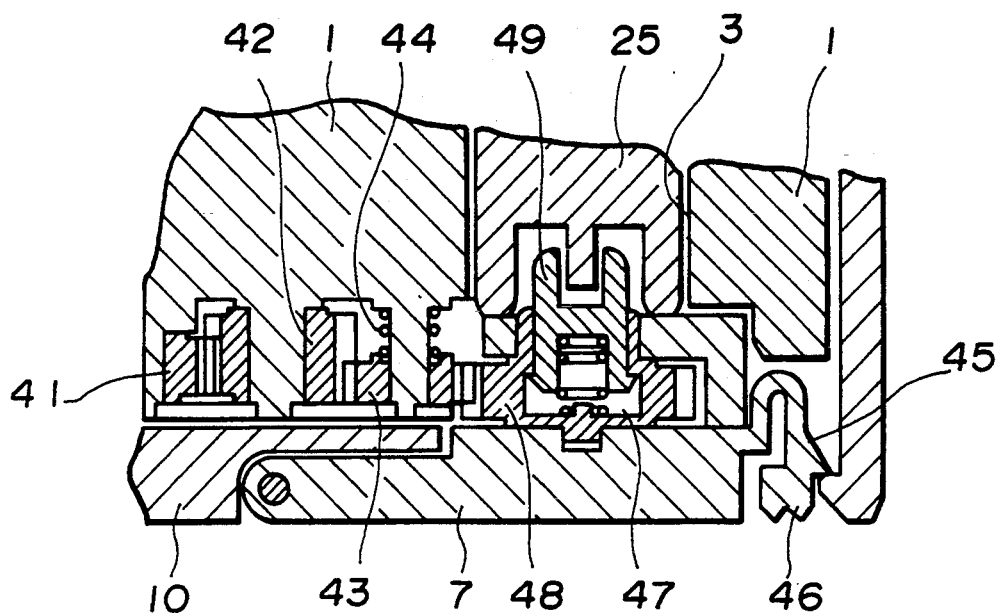
FIG. 10 is an enlarged sectional view showing a Patrone chamber and its surroundings in the first embodiment.

FIG. 10 is an enlarged sectional view showing the Patrone chamber and its surroundings in the camera of the first embodiment.

The Patrone chamber 3, in which the Patrone 25 is stowed, is formed in the camera body 1. A Patrone opening 10a, through which the Patrone is mounted, is formed on the bottom of the casing 10 (see FIG. 5).

Intermediate gears 41 and 42, and a clutch gear 43, which form a gear array for a film rewind driving system, are supported with axes by the lower part of the camera body 1, so that the gears can rotate freely and engage with one another. However, the clutch gear 43 is a clutch means for an R gear 48 and can slide axially. A gear pressing spring 44 that is a compression spring is placed between the gear 43 and camera body 1, and presses down the gear 43 in the camera body 1.

The Patrone cover 7, which can block the Patrone opening 10a in the casing 10, is held by the casing 10 so that the Patrone cover 7 can hinge freely. The open/close knob 46, which has the lock claw 45 serving as a locking means, is elastically formed as part of the Patrone cover 7. The lock claw 45 is locked in the casing 10 to hold the Patrone cover 7 in the closed state. The R gear 48 and an R fork 49, which constitute a driving force transmission means for film rewind, are supported with axes by the Patrone cover 7, so that they can rotate freely. At a position at which the Patrone cover 7 is closed, the R gear 48 engages with the clutch gear 43. The gear 48 is pressed upwardly by a spring 47.

When the Patrone cover 7 is closed, if the R gear 48 and clutch gear 43 are not in phase with each other or not enabled to engage with each other, the clutch gear 43 is pushed up. The clutch gear 43 or R gear 48 then rotates, whereby the R gear 48 and clutch gear 43 are engaged with each other and coupled with each other.

Figure 11:
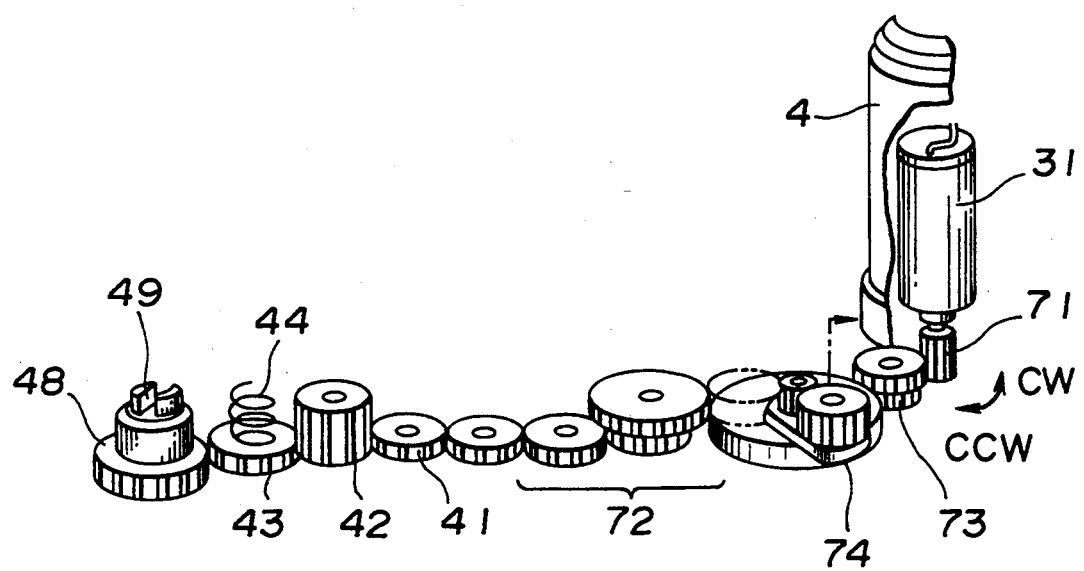
FIG. 11 is an oblique view showing an arrangement of a film feed driving mechanism in the first embodiment.

FIG. 11 shows an arrangement of film feed and film rewind driving systems in the camera of this embodiment. The drive motor 31 serving as a film feed/rewind driving means is secured to the camera body 1 and controlled by a control circuit 61, which will be described later, shown in FIG. 12. A pinion gear 71 is fixed to the output axis of the motor 31 and connected to a known planetary clutching mechanism via a reduction gear serving as a film feed/rewind driving means.

When the drive motor 31 rotates clockwise, the planetary clutching mechanism transmits driving force to the spool 4 and thus rotates the spool in a film wind direction. When the drive motor 31 rotates counterclockwise, the planetary clutching mechanism transmits the driving force to a gear array 72 serving as a film rewind driving means and thus drives the R gear 48 via the intermediate gears 41 and 42 and clutch gear 43. The planetary clutching mechanism then rotates the R fork 49 in the film rewind direction. Consequently, the film 21 is rewound.

Figure 12:
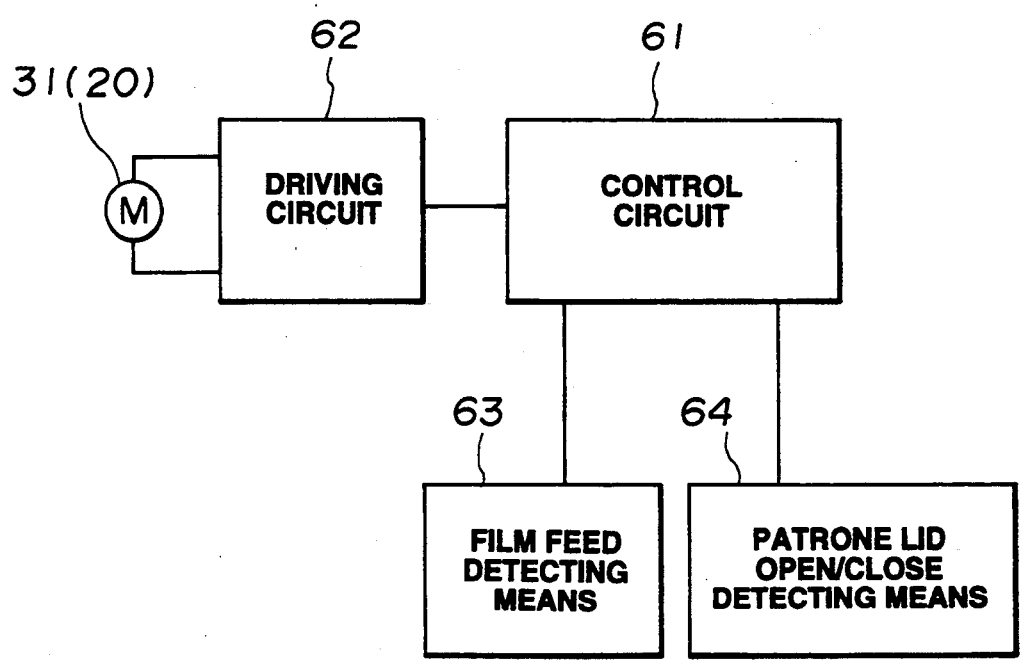
FIG. 12 is a block diagram showing a film drive electric control system in the camera of the first embodiment.

FIG. 12 shows the components of a film drive electric control system in the camera of this embodiment. The control circuit 61 including a CPU inputs a signal from a film feed detecting means 63 that is a photoreflector for detecting movement of perforations. The control circuit 61 also inputs a signal from a Patrone cover open/close detecting means 64 that is a leaf-spring switch for detecting the open or closed state of the Patrone cover. Based on these signals, the control circuit 61 drives the film wind/rewind drive motor 31 via a driving circuit 62. The driving circuit 62 is a bridge circuit including a power transistor.

The film drive electric control system shown in FIG. 12 can apply to the cameras of other embodiments to be described later.

The operation of the camera of the first embodiment having the aforesaid components will be described below.

When a camera is constructed, lens focusing is performed, as shown in FIG. 4, with the back cover 6 removed. The pull-out sheet 5 has a regulation hole 11 in an area opposed to the mirror or light receiver of a regulator, or as described previously, is made of a material that transmits 50% or more of visible light. This structure provides a sufficient regulatory beam. Regulation can be done merely by setting the camera in the regulator. In other words, the pull-out sheet 5 need not be taken up.

For exposure compensation, a decrease in transmittance of the pull-out sheet 5 or in the quantity of light due to vignetting of a beam should be compensated for.

Next, the movements for mounting and demounting the Patrone 25, and feeding film made in the camera of the first embodiment will be described below.

For mounting a Patrone, when the Patrone cover 7 is closed, as shown in FIG. 10, with the clock claw 45 at the locked position, the open/close knob 46 is moved to the left. Whereby lock claw 45 is thus moved to the left toward the unlocking position so that the lock claw 45 will be unlocked from the casing 10. The Patrone cover 7 is thus enabled to open. The Patrone cover 7 is opened to mount the Patrone 25 in the direction shown in FIG. 5.

Before the Patrone 25 is Inserted in the camera body 1, as shown in FIG. 9, the pull-out sheet 5 is held by the sheet presser 35 of the Patrone presser 37 in a state that the pull-out sheet 5 has withdrawn from the Patrone 25. The pull-out sheet 5 will therefore not be folded in by the Patrone 25.

When the Patrone 25 is inserted halfway, the Patrone 25 presses the Patrone presser 37. This causes the sheet presser 35 to withdraw from the pull-out sheet 5. The pull-out sheet 5 then comes into contact with the Patrone 25. With this state retained, the Patrone 25 is further inserted. The Patrone 25 further moves with the pull-out sheet 5 in contact with the Patrone 25.

After the Patrone 25 is inserted, the Patrone cover 7 is closed. In the process of closing, the R gear 48 is positioned to engage with the clutch gear 43. At this time, if the teeth of the clutch gear 43 and R gear 48 interfere with each other, the R gear 48 causes the clutch gear 43 to rise against the gear pressing spring 44.

When an attempt is made to close the Patrone cover 7, the inclined plane of the lock claw 45 abuts on the inclined plane of the casing 10. With the movement of the Patrone cover 7, the lock claw 45 moves to the left once along the inclined plane of the casing 10. When the Patrone cover 47 is closed, the lock claw 45 moves to the right toward the locking position. The Patrone cover 7 is then locked. The movement of the Patrone cover 7 from the open position to the closed position is detected by a known switch that is the Patrone cover open/close detecting means 64. The control circuit 61 allows the motor 31 to rotate clockwise. The rotation causes the spool 4 to rotate in the film wind direction. The claw 13 on the film pull-out sheet 5 is fitted into the fitting hole 24 in the film 21, whereby the film 21 is pulled out and then taken up by the spool 4 (See FIG. 8). The R gear 48 then rotates, whereby the clutch gear 43 and R gear 48 become in phase with each other and are enabled to engage with each other. The clutch gear 43 then moves down due to the pressing spring 44 and engages with the R gear 48.

After a sequence of photographic operations terminates, when film rewind is to be done, a control circuit which is not shown allows the motor 31 to rotate counterclockwise. The R fork 49 then rotates the spool in the Patrone 25 in the film rewind direction. The pull-out sheet 5 is therefore rewound together with the film 21. When the film 21 substantially comes to an end, the pull-out sheet 5 rides on the inclined plane 27 of the Patrone 25 and the claw 13 on the pull-out sheet 5 is almost released. The film 21 continues to move until the bosses 23 enter the notches 28 on the Patrone 25. The film 21 then stops. The fact that the perforations 22 do not move is detected by a known detecting means, for example, a photo-reflector. The control circuit then stops the motor 31.

Next, the movements for opening the Patrone cover 7 will be described.

When the open/close knob 46 is moved to the left in FIG. 10, the lock claw 45 moves to the left to unlock the Patrone cover 7. The Patrone cover 7 can now be opened. Thereafter, the Patrone 25 is demounted from the camera body 1. In the meantime, the claw 13 on the pull-out sheet 5 is released from the fitting hole 24 in the film 21 because of its shape of a circular arc. When the Patrone 25 is extracted, the Patrone 25 is freed from the Patrone presser 37. The Patrone presser 37 rotates clockwise in FIG. 6 due to the spring 36 and changes its state from the one shown in FIG. 6 to the one shown in FIG. 9. The sheet presser 35 separates the pull-out sheet 5 from the Patrone 25 and holds the pull-out sheet 5. When the Patrone 25 is removed and the Patrone cover 7 is closed, a series of movements is completed.

As mentioned above, in the camera of the first embodiment, the pull-out sheet 5 is made of a material having a transmittance of 50% or higher, or provided with an opening that, when the pull-out sheet 5 is located at the initial position, lies in the center of the aperture 2. This obviates the necessity of taking up the pull-out sheet 5 using the spool 4 in order to withdraw the pull-out sheet 5 from the aperture 2 prior to lens focusing or exposure compensation. Despite the simple structure, regulation can be achieved effortlessly and film loading can be accomplished readily.

In the camera of this embodiment, the film wind and film rewind driving systems are gathered in the lower part of the camera body 1. This enables efficient use of space in the camera body and permits a compact design. Furthermore, the Patrone cover 7 is formed on the bottom of the camera, which contributes to a better appearance. Moreover, the back cover of the camera is not wide (unlike the back cover of a conventional camera). This permits the excellent shading characteristic. Engagement between members or flocking, which has been indispensable for shading, can therefore be minimized. The elaborated structures of the Patrone 25, film 21, and pull-out sheet 5 enable the simple mechanism to pull out or wind the film 21 from the Patrone. Film loading can therefore be achieved quite readily.

Furthermore, the clutching mechanism interlocked with the Patrone cover 7 is realized as simply as by employing the clutch gear 43 that is vertically movable. Nevertheless, after the Patrone cover 7 is closed, when the drive motor 31 rotates, the clutch gear 43 and R gear 48 are engaged with each other reliably. The film 21 can be rewound reliably without fear of damaging a gear. Moreover, since the lock claw 45 and open/close knob 46 are formed as part of the Patrone cover 7, additional parts need not be installed to form a locking mechanism. Thus, an inexpensive camera can be provided.

Furthermore, the driving force transmission means is supported by the Patrone cover and camera body, and the driving force transmission means and driving means are located in the lower part of a camera. This realizes the compact design. Interlocked with the movement of the Patrone cover, the driving force transmission means and driving means are coupled with each other. This eliminates such a fear that, when the cover is opened, a user may touch a Patrone or a film drive carelessly. Thus, the camera offers improved reliability and better appearance, and provides other outstanding advantages.

Next, a camera of the second embodiment of the present invention will be described.

Figure 20A:
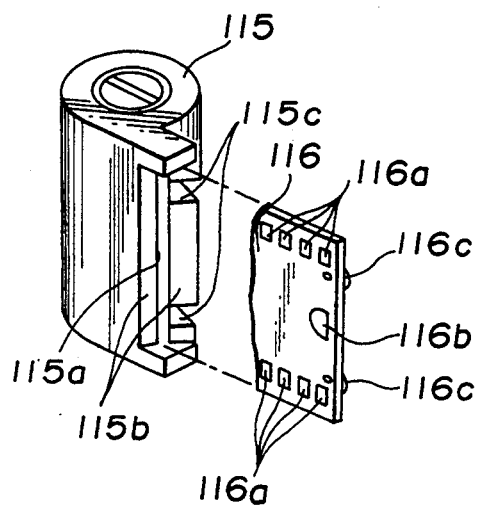
FIG. 20A is an oblique view showing a Patrone employed for the camera of the second embodiment.
Figure 20B:
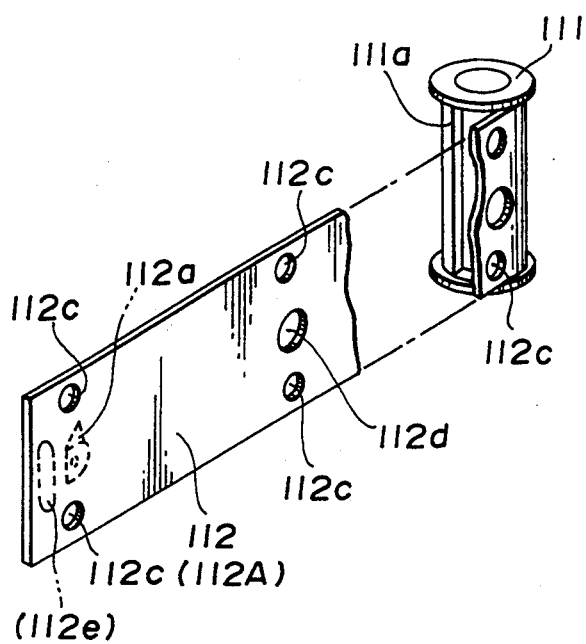
FIG. 20B is an oblique view showing a spool and a pull-out sheet incorporated in the camera of the second embodiment.

This camera is based on the technique that is applied to the camera of the first embodiment, or that a Patrone 115, which contains film whose distal part is not tongued or not provided with a leader, as shown in FIG. 20A, is dropped into a Patrone chamber to load film. A film pull-out sheet 112 shown in FIG. 20B is used to pull out or wind film.

Figure 13:
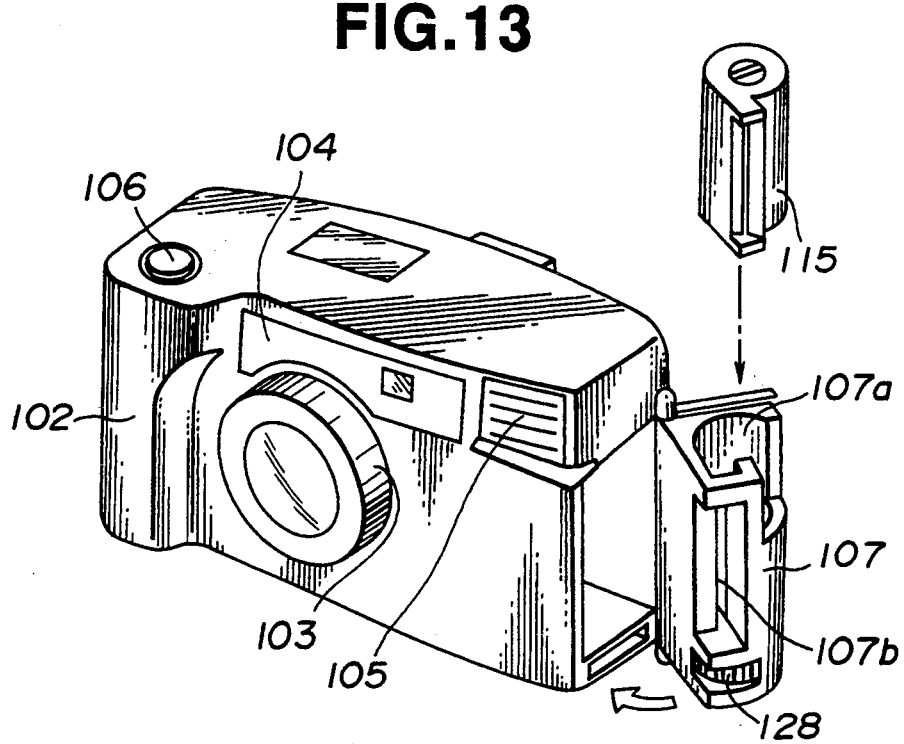
FIG. 13 is an oblique view showing a camera of a second embodiment of the present invention in a state in which a Patrone cover is opened.

FIG. 13 is an oblique view showing the appearance of the camera of this embodiment, wherein the camera is viewed from front with a Patrone cover 107 open. As shown in FIG. 13, a release button 106 is located at the corner (left hand in FIG. 13) of the top of the camera. A viewfinder auto-focusing window 104 and a strobe window 105 are situated in the upper part of the front surface or the camera. A lens barrel 103 is located in the center of the front surface.

Mounting a Patrone 115 is carried out in the opened state of cover 107 shown in FIG. 13. To be more specific, the Patrone 115 is inserted in the Patrone cover 107 from above. The Patrone cover 107 is then closed by moving in an arrow direction as shown in FIG. 13. Film 116 in the Patrone 115 is then wound on a spool 111 (See FIG. 17). The Patrone cover 107 consists of a Patrone chamber 107a and a film pull-out port 107b.

Figure 14:
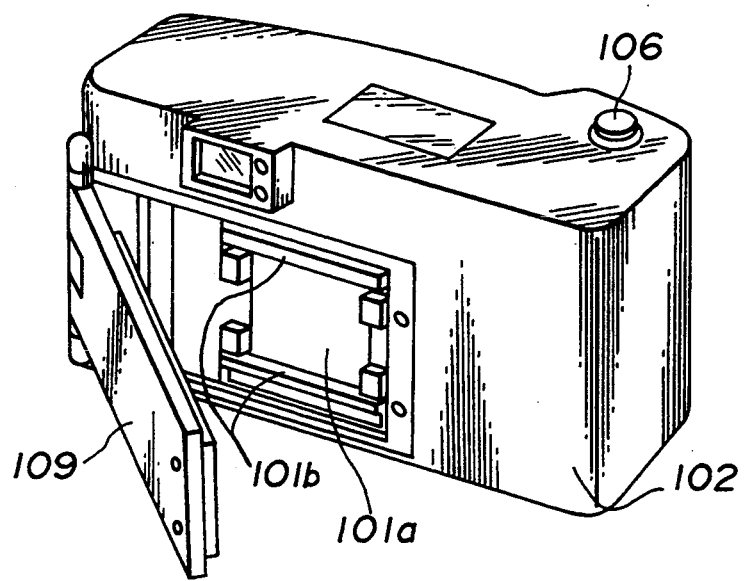
FIG. 14 is an oblique view showing the camera of the second embodiment in a state in which an aperture cover is opened.

FIG. 14 is an oblique view of the camera of the second embodiment, wherein the camera is viewed from behind with an aperture cover 109 open. The aperture cover 109 is opened when regulation is carried out in an aperture 101a in the process of constructing a camera or when an aperture rail 101b is cleaned.

Figure 15:
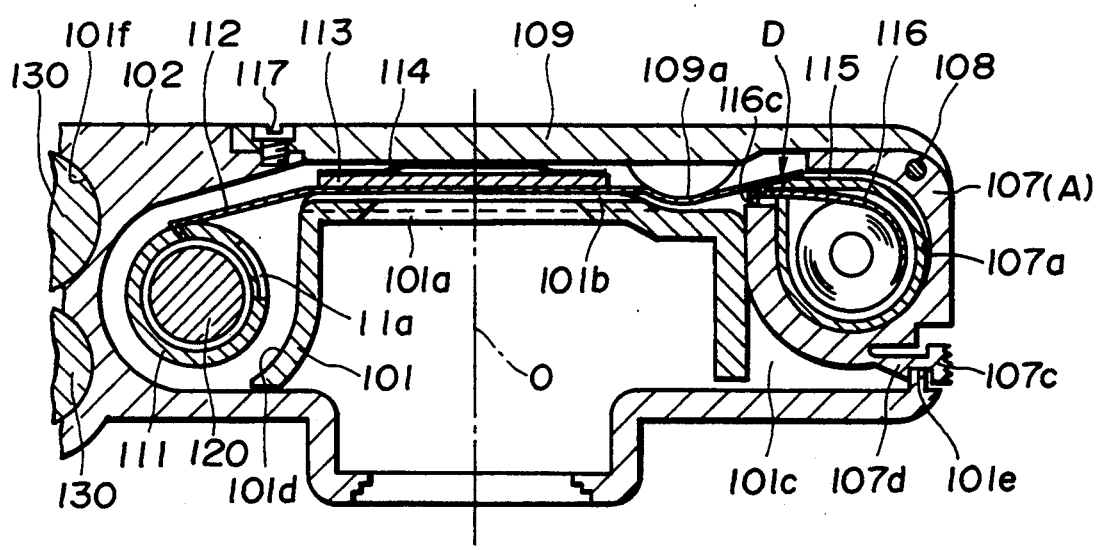
FIG. 15 is a cross-sectional view showing a camera body of the camera of the second embodiment in a state in which Patrone is mounted.
Figure 16:
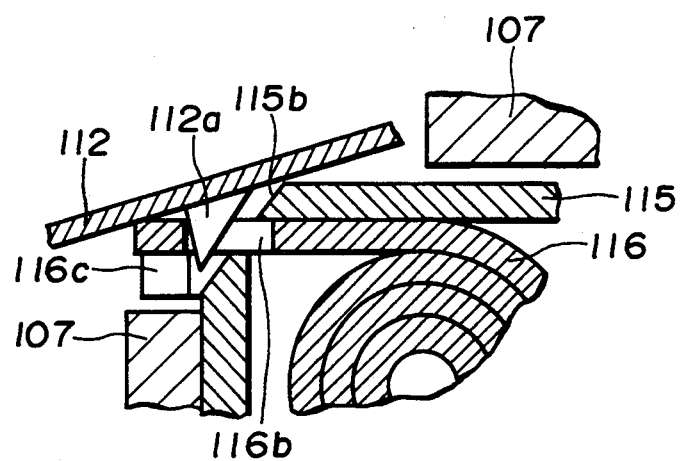
FIG. 16 is an enlarged view of an area D in FIG. 15.
Figure 17:
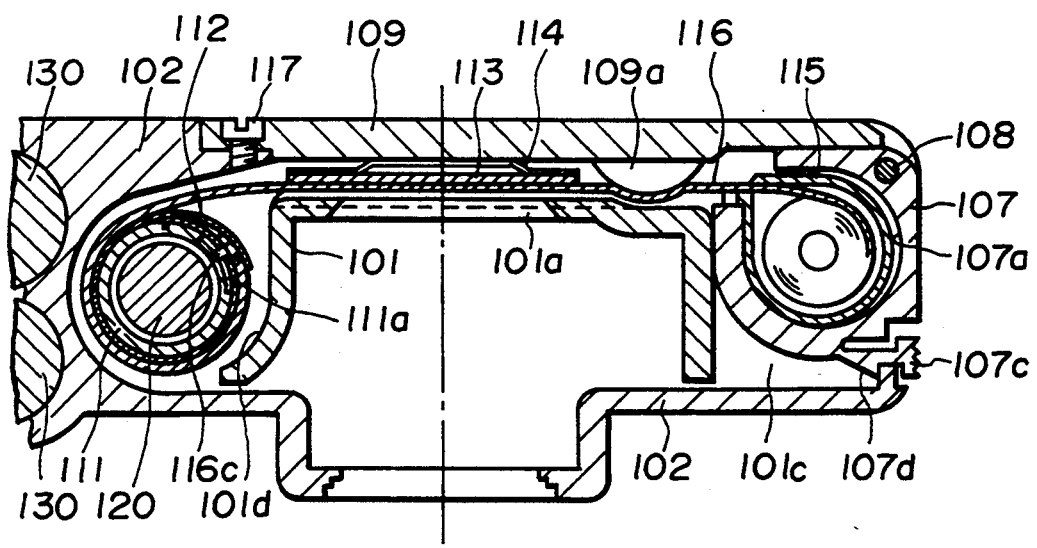
FIG. 17 is a cross-sectional view showing the camera body of the camera of the second embodiment in a state in which after a Patrone is mounted, film is wound.
Figure 18:
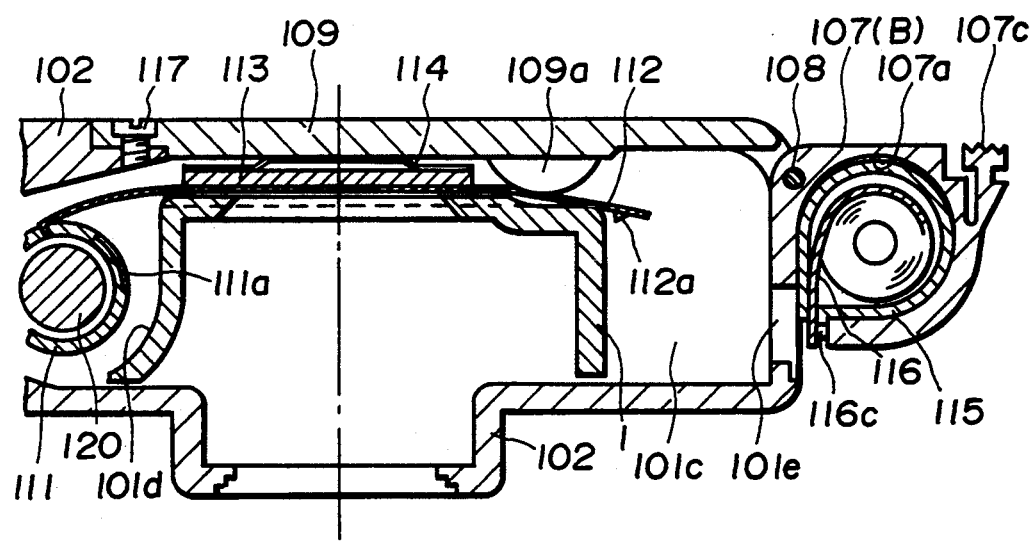
FIG. 18 is a cross-sectional view showing the camera body of the camera of the second embodiment in a state in which a Patrone cover also serving as a Patrone chamber is opened.
Figure 19:
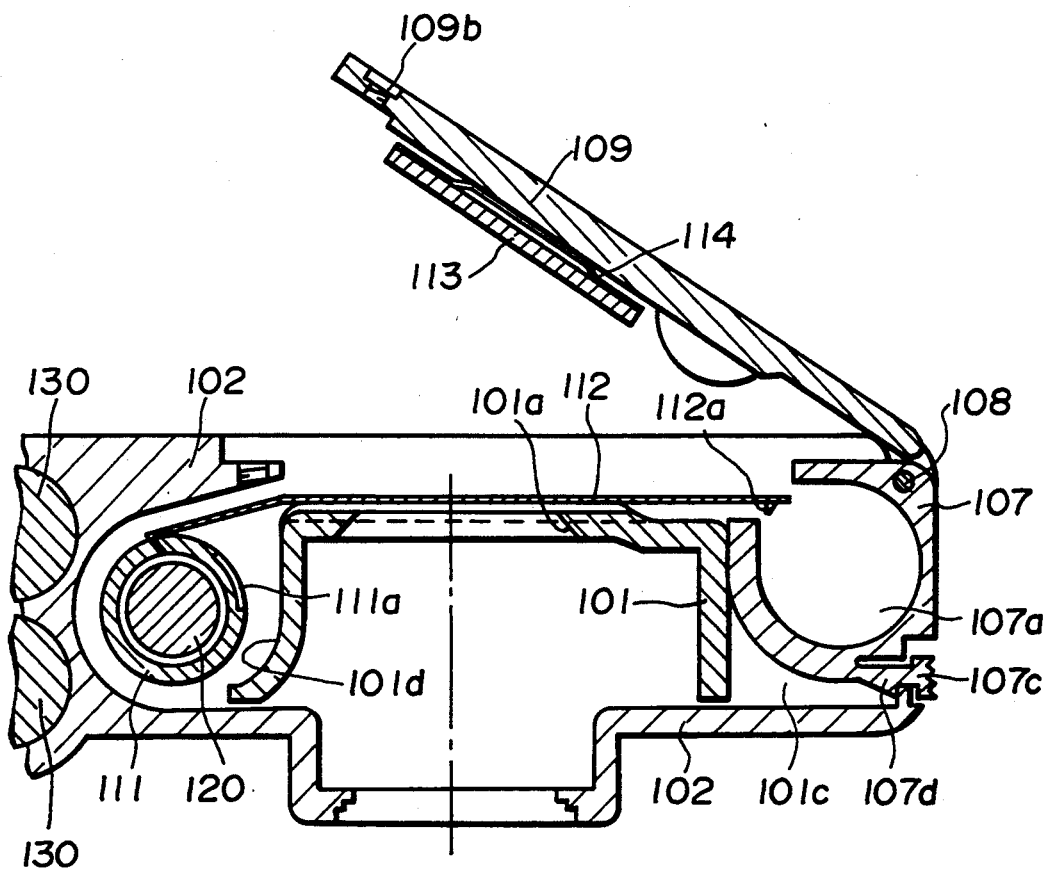
FIG. 19 is a cross-sectional view showing the camera body of the camera of the second embodiment in a state in which an aperture cover is opened.

FIG. 15 is a cross-sectional view showing a film feed system and its surroundings in a state in which a Patrone is mounted. FIG. 16 is an enlarged view of an area D of FIG. 15. FIG. 17 is a cross-sectional view showing the film feed system and its surroundings in a state in which film is wound on after the Patrone is mounted. FIG. 18 is a cross-sectional view showing the film feed system and its surroundings in a state that the Patrone cover 107 serving as a Patrone chamber is opened to mount or demount a Patrone. FIG. 19 is a cross-sectional view showing the film feed system and its surroundings in a state in which the aperture cover 109 is opened.

As shown in FIG. 15, in this camera, a Patrone stowage 101c is formed in the right part of a camera body 101 having an exposure aperture opening 101a in the center thereof, and a spool chamber 101d is formed in the left part thereof.

A casing 102 is supported by the outer circumference of the camera body 101 and united with the outer circumference of the camera body 101. A battery chamber 101f, in which batteries 130 are stowed, is formed to the left of the spool chamber 101d in the casing 102. The Patrone stowage 101c has a Patrone opening 101e in which the Patrone cover 107 having the Patrone chamber 107a and serving as the Patrone opening blocking means is turned around and stowed. The Patrone opening 101e is blocked or exposed by the Patrone cover 107. The Patrone cover 107 is supported with a supporting axis 108 provided on the casing 102 so that it can hinge freely.

The aperture cover 109, which can block or expose the aperture 101a, is supported with the supporting axis 108 provided on the casing 102 so that it can hinge freely. The aperture cover 109 is secured to the casing 102 using a screw 117. The supporting axis 108 penetrates through the rotation centers of the Patrone cover 107 and aperture cover 109, and is mounted in the casing 102 as part of the casing 102.

On the surface of the aperture cover 109 opposed to the aperture 101a, a presser plate 113 is pressed by a pressing spring 114 so as to be in contact with the rail 101b laid on behind the aperture 101a in the camera body. The presser plate 113 is supported by the pressing spring 114. To the right of the presser plate 113 on the aperture cover 109, a hump 109a is formed so as to press film 116 beyond the rail 101b.

The presser plate 113 and rail 101b provide a space through which film passes. A film feed/rewind drive motor 120 is formed as part of the camera body 101 in the spool chamber 101d and is supported by the camera body 101. A spool 111, about which the film 116 is wound, is mounted on the outer circumference of the drive motor 20 and supported with an axis by the body 101 so that it can rotate freely. The pull-out sheet 112 whose one end is fixed to the spool 111 and whose the other end is provided with a claw 112a capable of locking the film 116 is held extended to the Patrone chamber 101c beyond the aperture 101a.

Next, the Patrone 115 and pull-out sheet 112 employed for this camera will be described in detail.

FIG. 20A is an oblique view of the Patrone 115 having a shape similar to the Patrone employed for the camera of the first embodiment. The structure of the Patrone will be re-cited. The film 116 to be stowed in the Patrone 115 does not have a tongued distal part or a leader but has a fitting hole 116b, into which a claw 112a on the pull-out sheet 112 (See FIGS. 20B and 21A) is fitted, in the distal part thereof. Two bosses 116c are located on opposite sides of the fitting hole 116b in the distal part. An inclined plane 115b is formed in the vicinity of a film pull-out port 115a of the Patrone 115. Notches 115c are formed so that when the film 116 is wound up, the bosses will be locked therein.

FIG. 20B is an oblique view showing the pull-out sheet 112 and spool 111 employed for this camera. The claw 112a capable of being fitted into the fitting hole 116b of the film 116 is implanted in the distal part of the pull-out sheet 112. Escape holes 112c, into which the bosses 116c on the film 116 will be evacuated, are formed on opposite sides of the claw 112a. Additional escape holes 112c are formed in the proximal part of the sheet 112, so that when the sheet is wound up about the spool 111, the bosses 116c on the film 116 will be evacuated thereinto. For the same reason, escape holes 112d are bored so that when the pull-out sheet 112 is wound up about the spool, the claw 112a thereof will be evacuated thereinto. The spool 111 has a recess 111a into which the claw 112a and bosses 116c will be evacuated.

Figure 21A:
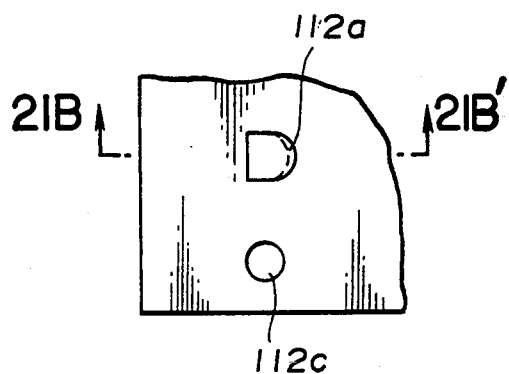
FIG. 21A is an enlarged view showing the distal part of the pull-out sheet in FIG. 20B.
Figure 21B:
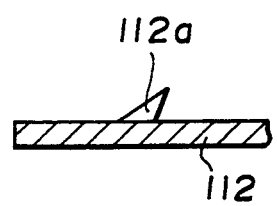
FIG. 21B is a sectional view of the pull-out sheet of FIG. 21A looking in the direction of arrows 21B—21B'.

FIG. 21A is an enlarged view of the distal part of the pull-out sheet 12. FIG. 21B is a 21B—21B′ sectional view of FIG. 21A, showing the sectional shape of the claw 112a.

Figure 22:
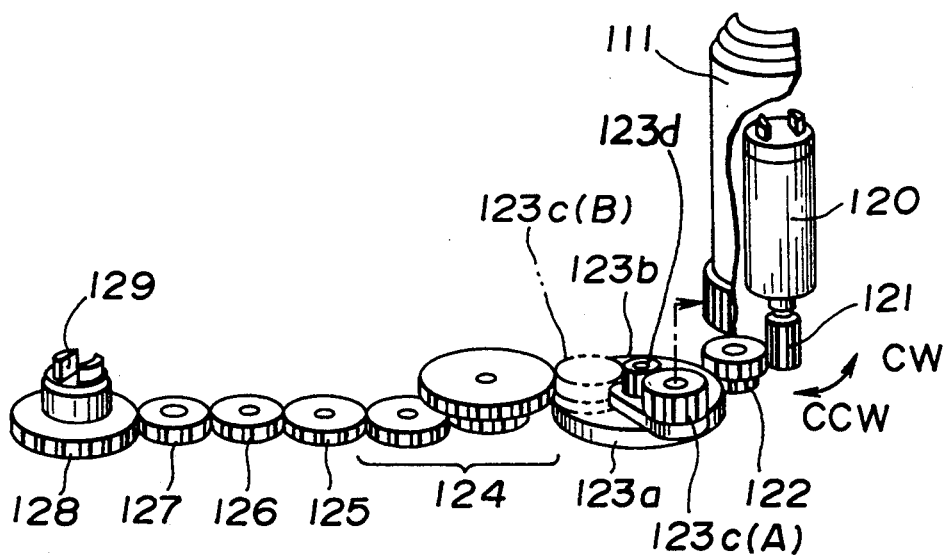
FIG. 22 shows film feed and film rewind driving systems incorporated in the camera of the second embodiment.
Figure 23:
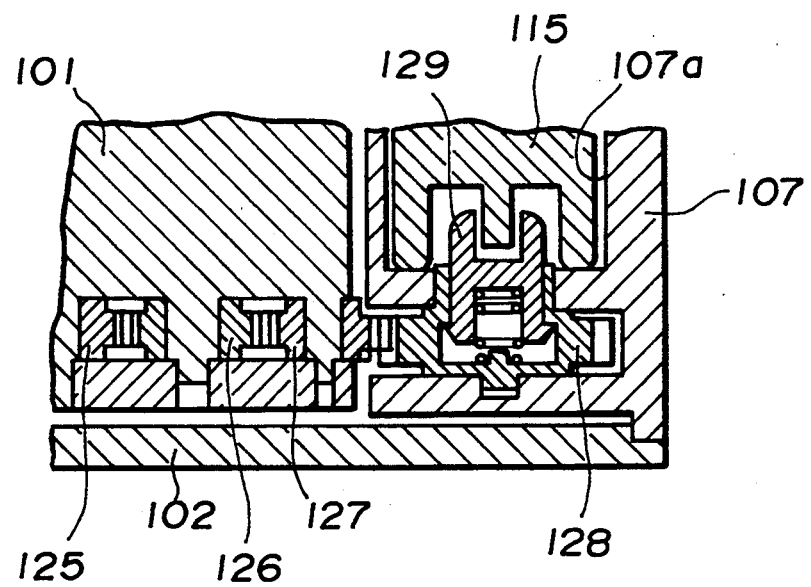
FIG. 23 shows a longitudinal section viewing a film rewind drive in the vicinity of a Patrone chamber in the camera of the second embodiment from the front of the film rewind drive.

As apparent from the diagram of FIG. 22 showing the arrangement of a film driving system and the longitudinal sectional view of FIG. 23 showing the Patrone chamber and its surroundings with the Patrone cover 107 closed, the film driving system for the camera of the second embodiment comprises a gear array 124 serving as a film wind/rewind driving means, a driving system including a clutch gear 127, and an R gear 128 serving as a driving force transmission means for transmitting the driving force of the driving system to a film take-up axis of the Patrone 115. The film driving system is located in the lower part of the camera shown in FIG. 13.

The driving system will be described in more detail. As shown in FIG. 22, the drive motor 120 is secured to the camera body 101 which is not shown. A pinion gear 121 is fixed to the output axis of the drive motor 120. The driving force is transmitted to a known planetary clutch means, which is made up of an intermediate gear 123d, a sun gear 123b united with the intermediate gear 123d, and a planetary gear 123c, via a reduction gear 122.

When the drive motor 120 rotates clockwise, the planetary gear 123c of the planetary clutching mechanism revolves to a revolution point 123c(A), engages with the gear of the spool 111, and then transmits the driving force of the drive motor 120 to the spool 111.

When the drive motor 120 rotates counterclockwise, the planetary gear 123c of the planetary clutching mechanism revolves to a revolution point 123c(B), and engages with the film rewind gear array 124. Thus, the driving force of the drive motor is transmitted to the R gear 128 and an R fork 129 via the intermediate gears 125 and 126 through the clutch gear 127.

As shown in FIG. 23, the rotation of the clutch gear 127 is transmitted to the R gear 128 resting on the Patrone cover 107. The clutch gear 127 is supported so that it can move vertically. The R fork 129, which is being pressed upward, rotates in phase with the R gear 128, thus rewinding the film 116.

The clutch gear 127 and R gear 128 constitute a clutch means that is interlocked with the opening or closing of the Patrone cover 107. Specifically, when the Patrone cover 107 in FIG. 13 is opened, the clutch gear 127 and R gear 128 are disabled from coupling each other. When the Patrone cover 107 is closed, as shown in FIG. 23, the clutch gear 127 and R gear 128 are coupled each other and engaged with each other. The driving force of the drive motor 120 can then be transmitted to the take-up axis of the Patrone 115.

As shown in FIGS. 15 and 18, the Patrone cover 107 has the Patrone stowage 107a, and is supported with the supporting axis 108 by the casing 102 so that it can hinge freely. A lock knob 107c, which has a lock claw 107d serving as a locking means, is formed as part of the Patrone cover 107 so that it can deform elastically. This structure helps hold the Patrone cover 107 at a blocking position 107(A) at which the Patrone opening 101e shown in FIG. 15 is blocked. The lock knob 107c is hand-operated to unlock the lock claw 107d from the casing 102, thus setting up an unlocked state. The Patrone cover 107 then can hinge to an open position 107(B) in FIG. 18. The Patrone opening is then exposed. In this state, the Patrone 115 can be mounted or demounted.

The film drive electric control system in the camera of this embodiment has the same components as those shown in the block diagram of FIG. 12 and employed for the camera of the first embodiment.

Next, the movements for loading, winding, and rewinding film made in the camera of the second embodiment having the aforesaid components will be described.

To begin with, as shown in FIG. 13, the Patrone cover 107 is opened, and the Patrone 115 as dropped into the Patrone chamber 107a of the Patrone cover 107. FIG. 18 is a cross-sectional view showing the camera in this state. Thereafter, the Patrone cover 107 is closed and placed in a state shown in FIG. 15. The lock claw 107d is caught by the casing 102 and the Patrone cover 107 is held closed. The claw 112a on the pull-out sheet 112 is fitted into the fitting hole 116b of the film 116. The film 116 is thus locked. The detail of this state is shown in FIG. 16 which is an enlarged view of an area D including the claw 112a on the pullout sheet 112 and its surroundings. When the Patrone cover 107 is closed, as shown in FIG. 23, the R gear 128 and the gear 127 of a film rewind driving system engage with each other.

In the meantime, the closed state is detected by the Patrone cover open/close detecting means 64 (See FIG. 12). The control circuit 61 allows the driving circuit 62 to drive the drive motor 120 clockwise or in the CW direction in FIG. 22. The drive causes the planetary gear 123c of the planetary clutching mechanism to engage with the gear of the spool 111. The spool 111 then rotates in the film wind direction. When the film feed detecting means 63 detects a film feed defined for preliminary film wind, the motor 120 is stopped and the camera is placed in the state shown in FIG. 17.

Thereafter, normal photography is performed with releasing. After photography is completed, when film is rewound, the control circuit 61 drives the drive motor 120 counterclockwise or in the CCW direction in FIG. 22. The planetary gear 123c of the planetary clutching mechanism in FIG. 22 engages with the film rewind gear array 124, which rotates the film take-up axis of the Patrone 115 in the film rewind direction. The film 116 is taken up by the Patrone 115. When the rewound film 116 comes to an end, the bosses 116c on the film are locked in the notches in the Patrone 115. This disables film rewind. At this time, the film feed detecting means 63 detects the fact that the film 116 is immobilized. The drive motor 120 is then stopped.

Thereafter, the lock knob 107c is moved upwardly in FIG. 15 to unlock the lock claw 107d. The Patrone cover 107 is then opened as shown in FIG. 18. The Patrone 115 is extracted. A series of movements for photography are thus completed.

Described next is the processing to be done when regulation is performed using a beam having passed through an aperture in the process of manufacturing a camera.

For regulation, first, as shown in FIG. 14 or 19, the screw 117 is removed to open the aperture cover 109. A measuring jig is placed on the rail 101b in the aperture and regulation is carried out. The regulation includes exposure compensation for a shutter and lens focusing. After the regulation is completed, the aperture cover 109 is closed and secured with the screw 117.

As described above, in the camera of the second embodiment, the film 116 can be loaded merely by dropping the Patrone 115 into the Patrone cover 107. Thereafter, the camera automatically pulls out the film 116 from the Patrone 115 and and winds on the film 116. The camera is thus easy to use and user friendly. Only the part of the casing 102 of the camera needed for mounting a Patrone is opened, and the other unnecessary part thereof is invisible from outside. This results in the better appearance of the camera. Moreover, openings are limited in number, which offers the excellent shading characteristic.

Furthermore, the film feed/rewind driving mechanism is located in the lower part of the camera body 101, so that a viewfinder, an auto-focusing unit, and a strobe can be arranged in the upper part thereof. The spaces in the camera can thus be utilized efficiently, which realizes the compact design. Moreover, the Patrone cover 107 is located on the side of a camera, which is helpful in mounting a Patrone and results in the bettered appearance of the camera. The aperture cover 109, which is not as large as a conventional back cover, can be adopted, providing the excellent shading characteristic and minimizing engagement between members or flocking which have been required for shading.

For regulation in the process of assembling, once the aperture cover 109 is opened, regulation including exposure compensation and lens focusing can be achieved using the aperture rail. This contributes to a decrease in man-hours and reduction in assembling costs. A user can clean the rail merely by loosening the screw 117 and opening the aperture cover 109 when he/she considers it necessary. The Patrone cover 107 and aperture cover 109 are supported by the common supporting axis 18. This simplifies the related structure, which is advantageous in terms of cost.

The driving force transmission means is supported by the Patrone cover and camera, and the driving force transmission means and driving means are located in the lower part of the camera. This structure permits a camera of compact design. Furthermore, the driving force transmission means and driving means are interlocked with the Patrone cover so as to easily couple to each other. Even when the Patrone cover is open, there is no fear that a user may touch a Patrone or a film drive carelessly. This results in improved reliability, bettered appearance, and other outstanding advantages of the camera.

Next, a camera of the third embodiment will be described in conjunction with FIGS. 24 to 28 that are cross-sectional views of the camera.

A Patrone employed for the camera of this embodiment is identical to the Patrone 115 shown in FIG. 20A and employed in the camera of the second embodiment. However, the film pull-out sheet is not the one identified by numeral 112 shown in FIG. 20B and employed for the camera of the second embodiment, but a pull-out sheet 112A (See FIG. 20B) having a presser hole 112e at the distal side of the claw 112a.

Even in the camera of this embodiment, the film 116 is loaded by dropping the Patrone 115 into the Patrone chamber. The camera of this embodiment differs from the one of the second embodiment in the structure of a back cover and the pressing mechanism for a pull-out sheet.

Figure 24:
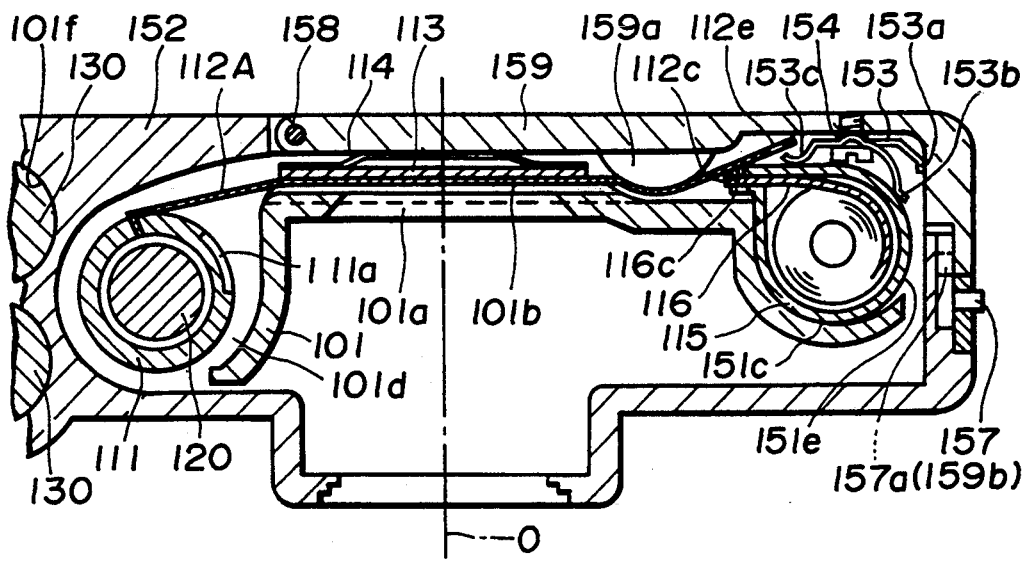
FIG. 24 is a cross-sectional view showing a camera body of a camera of a third embodiment of the present invention in a state that a Patrone is mounted.
Figure 25:
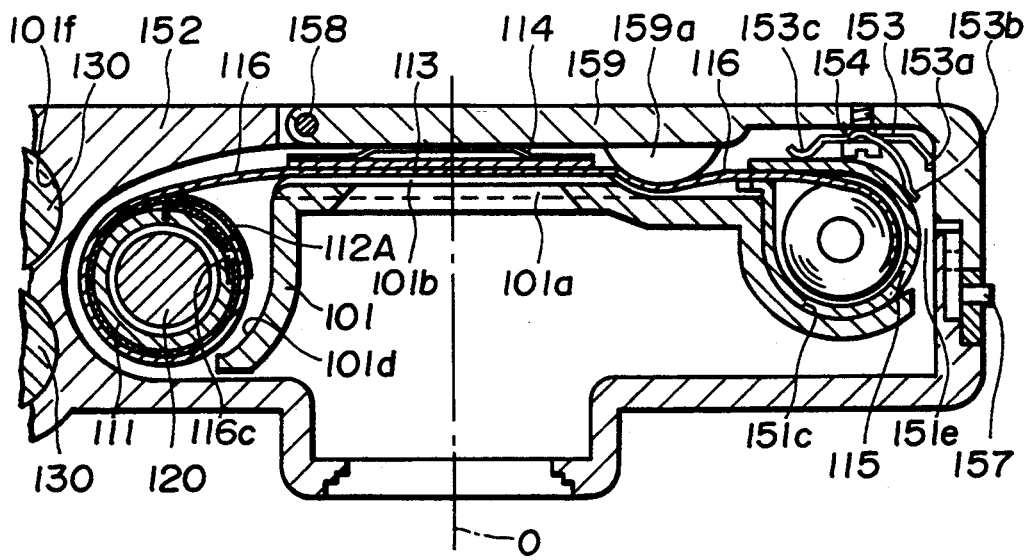
FIG. 25 is a cross-sectional view showing the camera body of the camera of the third embodiment in a state in which after a Patrone is mounted, film is wound.
Figure 26:
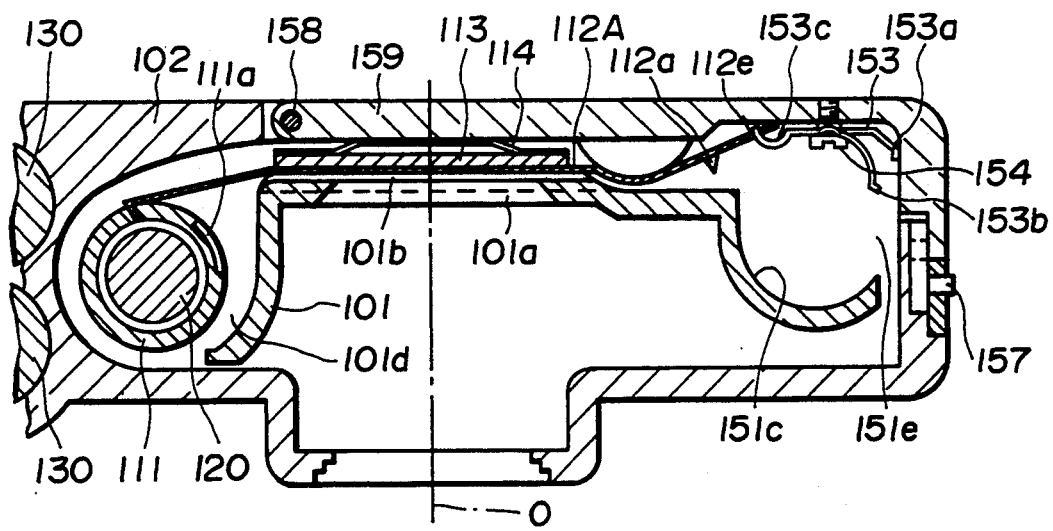
FIG. 26 is a cross-sectional view showing the camera body of the camera of the third embodiment in a state in which a Patrone is demounted.
Figure 27:
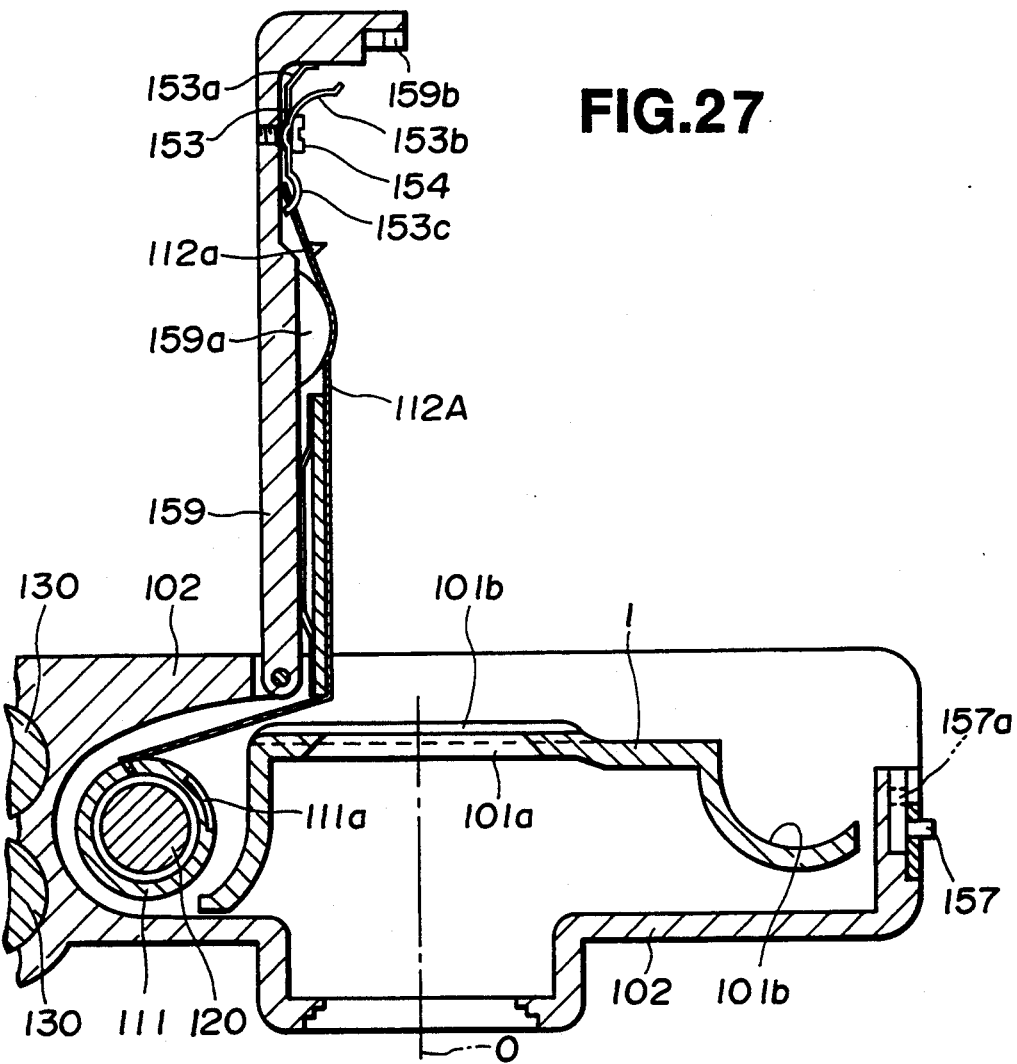
FIG. 27 is a cross-sectional view showing the camera body of the camera of the third embodiment in a state in which the back cover is opened.
Figure 28:
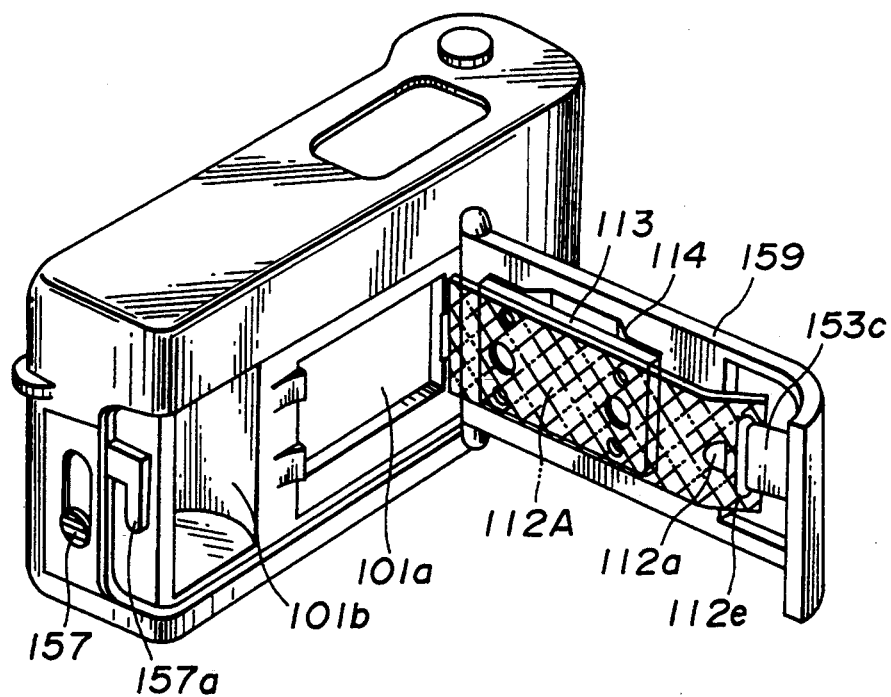
FIG. 28 is an oblique view showing the camera of the third embodiment in a state in which the back cover is opened.

FIG. 24 is a cross-sectional view showing a film feed path and its surroundings in a state in which a Patrone is mounted. FIG. 25 is a cross-sectional view showing the film feed path and its surroundings in a state in which after the Patrone is mounted, film is wound up. FIG. 26 is a cross-sectional view showing the film feed path and its surroundings in a state in which the Patrone is demounted. FIG. 27 is a cross-sectional view showing the film feed path and its surroundings in a state in which a back cover is opened with a Patrone unmounted. FIG. 28 is an oblique view, viewing the camera from the rear and with the back cover open. Component members identical to those in the camera of the second embodiment bear the same reference numerals, of which detailed description will be omitted.

In the camera of the third embodiment, the spool chamber 101d is formed in the left part of the camera body 101, which is shown in FIG. 24, having the exposure aperture opening 101a in the center. A Patrone chamber 151c having a Patrone opening 151e is formed in the right part thereof. The rail 101b for receiving the film 116 is formed behind the aperture 101a. A casing 152 is supported by the outer circumference of the camera body 101 and united with the outer circumference of the camera body 101. The battery chamber 101f, in which the batteries 130 are stowed, is formed to the left of the spool chamber 101d in the casing 152. A back cover key 157, which is a locking means capable of being displaced between a position at which back cover 159 is held blocked and a position at which the back cover 159 is enabled to open, is supported by the casing 152 so that it can slide.

The back cover 159 serves as both an aperture cover and a Patrone opening blocking means and is held behind the aperture 101a and the Patrone opening 151e of the Patrone chamber 151c in the body 101 so that it can hinge backward freely. The back cover 159 is supported with a supporting axis 158 provided on the casing 152, and, as mentioned above, can hinge between the blocking position and open position. The back cover 159 supports the presser plate 113 elastically via the pressing spring 114. The presser plate 113 is pressed by the pressing spring 114 so that when the back cover 159 is closed, the presser plate 113 will come into contact with the rail 101b.

A hump 159a is formed on the right of the presser plate 113 on the back cover 159 so that it will press film beyond the rail 101b.

A Patrone presser 153 is located in the portion of the back cover 159 facing the Patrone chamber 101c and held with a stepped screw 154 so that it can swing freely. The Patrone presser 153 is a united member of a contact 153b that abuts on a Patrone, a presser 153c that can press the end of the pull-out sheet 112A, and a spring 153a that is in contact with the back cover 159. The Patrone presser 153 is constrained to swing clockwise because of the spring 153a. As shown in FIGS. 24 and 25, when the Patrone 115 has been mounted, the contact 153b of the Patrone presser 153 abuts on the Patrone 115 and allows the Patrone 115 to lie at a specified position. At this time, the presser 153c is, as shown in FIG. 24, located at a position at which it does not come into contact with the pull-out sheet 112A. However, when the Patrone 115 is not mounted, as shown in FIG. 26, the Patrone presser 153 actually swings clockwise due to the elasticity of the spring 153a, and the presser 153c is fitted into a presser hole 112e in the pull-out sheet 112A. The pull-out sheet 112A is thus held on to the back cover 109.

As shown in FIGS. 24 through 27, the drive motor 120 for use in winding film is installed in the center of the spool chamber 101d in the camera body 101. The spool 111 that takes up film is attached to the outer circumference of the motor 120 and is supported with an axis by the camera body 101 so that it can rotate freely. One end of the pull-out sheet 112A is fixed to the spool 111, and the other end thereof extends to the Patrone chamber 151c beyond the aperture.

The claw 112a is implanted in the distal part of the sheet 112A, similar to the sheet, in the second embodiment, so that the claw 112a will be fitted into the locking hole 116b of the film 116 as shown in FIGS. 20B, 21A, and 21B. The spool 111, as well as the one shown in the second embodiment, has a recess 111a so that when the film is taken up, the claw 112a and bosses 116c on the film 116 shown in FIG. 20A will be evacuated to the recess 111a.

A film feed driving mechanism for the camera of the third embodiment has the same components as the one in the second embodiment; that is, the components shown in FIG. 22. A film drive electric control system for the camera of this embodiment has the same components as that in the first embodiment; that is, the components shown in FIG. 12.

Next, the movements for loading, winding, rewinding, and unloading film made in the camera of the third embodiment will be described.

Among the movements for normal photography including those related to mounting and demounting the Patrone 115, movements made initially are concerned with mounting the Patrone 115 in the camera. Specifically, when the Patrone 115 has not been mounted and the back cover 159 is closed as shown in FIG. 26, the back key 157 is slided to an open-enabled position. The back cover 159 is then opened as shown in FIG. 27 and the oblique view of FIG. 28. The Patrone 115 is then mounted in the Patrone chamber 151c. The back cover is closed. The camera is then placed in the state shown in FIG. 24.

In the state shown in FIG. 24, the contact 153b of the Patrone presser 153 is in contact with the Patrone 115, and the presser 153c thereof has released the pull-out sheet 112A. The claw 122a on the pull-out sheet 112A is fitted into the locking hole 116b of the film 116.

The Patrone cover open/close detecting means 64 in FIG. 12 detects the fact that the back cover 59 is closed. The control circuit 61 then allows the driving circuit 62 to rotate the drive motor 20 in the film wind direction. The driving force of the drive motor 120 is transmitted to the spool 111. The pull-out sheet 112A is then taken up by the spool 111. The film 116 is wound together with the sheet 112A because of the claw 112a on the sheet 112A. The film feed detecting means 63 in FIG. 12 detects a film feed of the film 116, defines the film wind by a specified feed as preliminary film wind, and then stops the drive motor 120. Thereafter, a sequence of photographic operations is carried out. The film is wound up sequentially in units of a feed for one frame. FIG. 25 shows the state of film wind under this photographic condition.

After photography terminates, the film 116 is rewound. The control circuit 61 allows the motor 120 to rotate in the film rewind direction. The driving force of the motor 120 is then transmitted to the R gear 128 shown in FIG. 22. The film take-up axis of the Patrone 115 then rotates to rewind the film 116. When film rewind terminates, the state shown in FIG. 15 is set up. Specifically, the bosses 116c on the film 116 are locked in the notches 115c in the Patrone 115, and film rewind is disabled. The film feed detecting means 63 in FIG. 12 detects the fact, and stops the motor 120. Film rewind thus terminates. Thereafter, the back key 157 is slided to open the back cover 159, and the Patrone 115 is extracted. FIGS. 27 and 28 show the state set up in this stage. The back cover 159 is then closed again. Thus, a series of movements for photography made in the camera is completed. FIG. 26 shows the camera in this state.

In the camera of the third embodiment, similar to that of the second embodiment, regulation using the aperture opening 101a can be achieved by, as shown in FIG. 27, opening the back cover 159 and placing a regulating jig on the rail 101b in the aperture. Cleaning the aperture opening 101a or rail 101b can be accomplished by opening the back cover 159 as shown in FIG. 27.

In the aforesaid camera of this embodiment, despite the simple mechanism, once a Patrone is mounted, the camera pulls out film from the Patrone and winds it up. The camera is thus proved easy to use and user friendly. Furthermore, the back cover 159 serves as an aperture cover and a Patrone cover alike is provided as a united structure. This helps simplify assembling and reduce costs. The spool chamber 101d remains shielded, which brings about the bettered appearance and excellent shading characteristic. A user can open the back cover to clean the rail whenever he/she considers it necessary. For regulation, a regulating jig can be set merely by opening the back cover. This results in the decreased man-hours for regulation and the lower cost.

Figure 29:
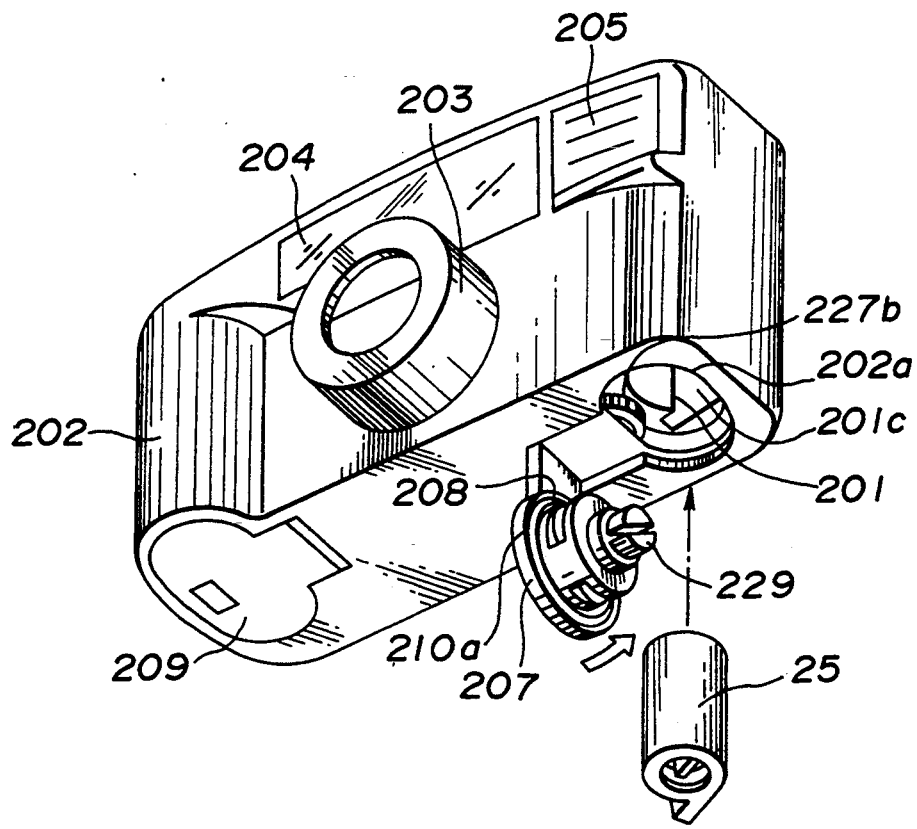
FIG. 29 is an oblique view showing the appearance of a camera of a fourth embodiment of the present invention.

FIG. 29 is an oblique view showing the appearance of a camera of the fourth embodiment of the present invention in a state that a Patrone cover is opened.

The camera of the fourth embodiment is of the type that a Patrone or a film cartridge, which contains film whose distal end is not tongued or not provided with a leader, is dropped into a Patrone chamber and thus mounted. The Patrone is identical to the Patrone 25 shown in FIG. 1 and employed for the camera of the first embodiment. Film 21 wound up in the Patrone 25 is pulled out and taken up by a spool, wherein the spool 4 and pull-out sheet 5 shown in FIG. 2 and employed for the camera of the first embodiment are adopted.

In the camera of the fourth embodiment, the Patrone 25 is mounted through a Patrone opening 202a in a casing 202 shown in FIG. 29. A Patrone cover 207 is then closed, enabling photography. As shown in FIG. 29, a strobe window 205 and a viewfinder window 204 are arranged in the upper part of the camera, and a lens barrel 203 is located in the center thereof.

Figure 30:
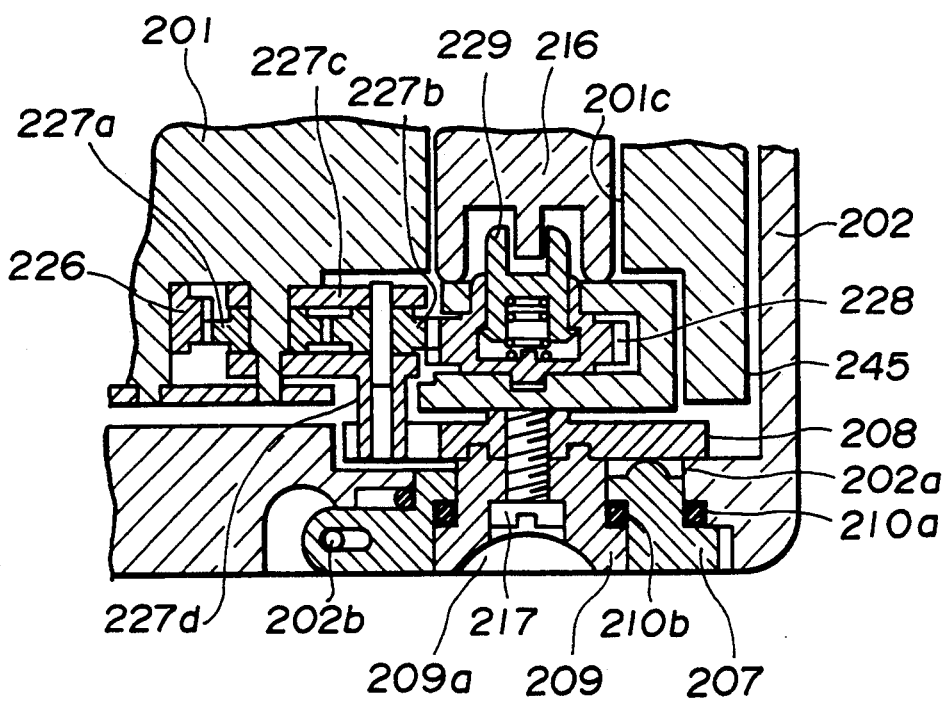
FIG. 30 is a longitudinal-sectional view showing a Patrone chamber and its surroundings in the camera of the fourth embodiment.
Figure 31:
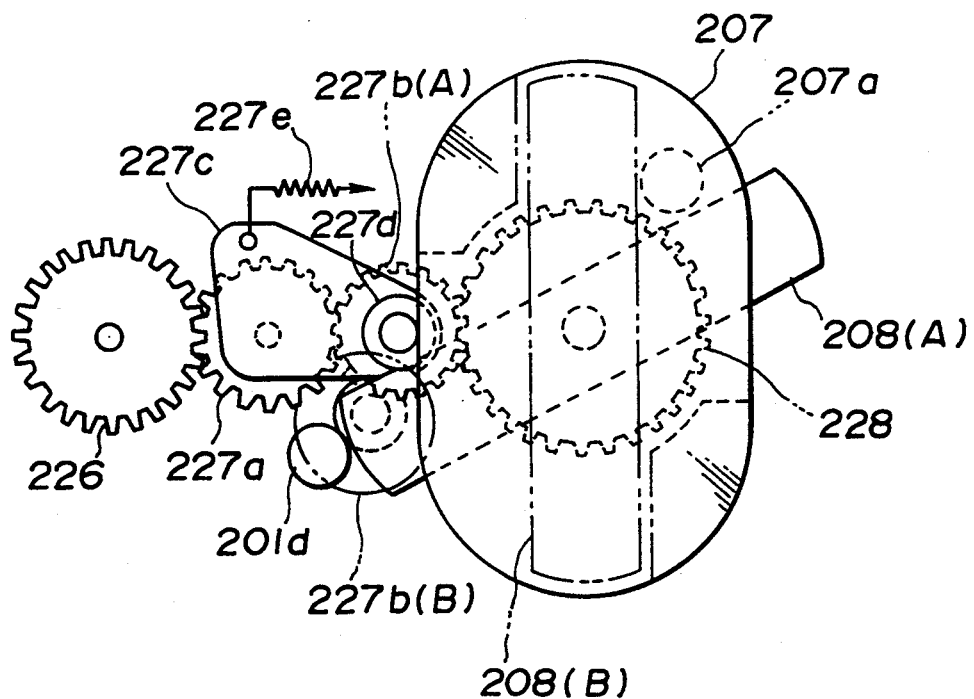
FIG. 31 shows a clutching mechanism in a film rewind driving system in the camera of the fourth embodiment.
Figure 32:
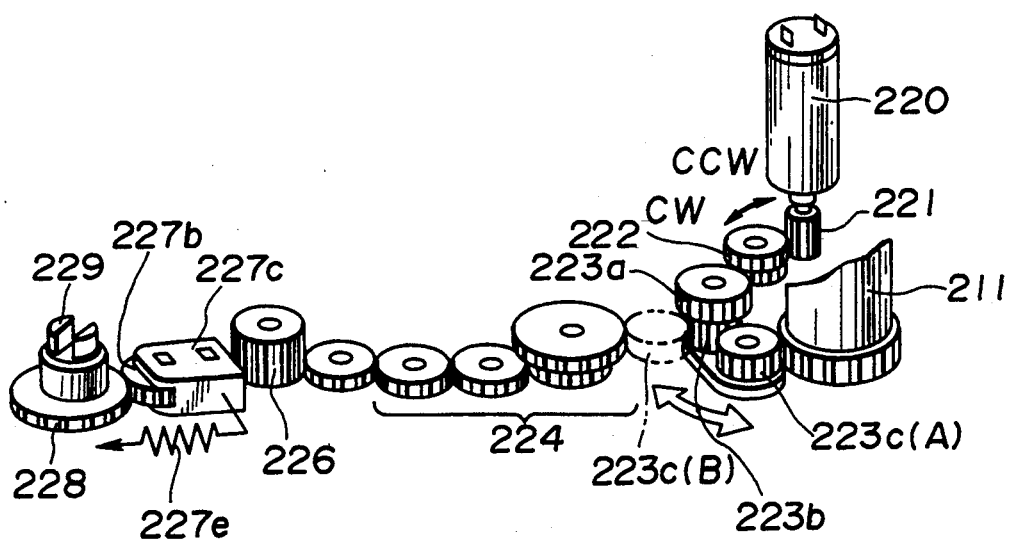
FIG. 32 shows an arrangement of film feed and film rewind driving systems in the camera of the fourth embodiment.

FIG. 30 is a longitudinal sectional view showing a Patrone chamber 201c and its surroundings in the camera. FIG. 31 is an enlarged plan view showing a lock-/feed driving mechanism located in the vicinity or the Patrone cover 207. FIG. 32 shows an arrangement of film feed and film rewind driving systems in the camera.

The components of the lock/feed driving mechanism and others in the camera of the fourth embodiment will be described in detail. As shown in FIG. 29, the casing 202 has the Patrone opening 202a in which the Patrone 25 can be inserted from below. The Patrone chamber 201c, in which the Patrone is stowed, is formed in a camera body 201.

As shown in FIG. 30, the Patrone cover 207, which can hinge between a position at which the Patrone cover 207 blocks the opening 202a and a position at which the Patrone cover 207 withdraws from the opening 202a, is supported with a supporting axis member 202b provided on the casing 202. A lock lever 208, which can pivot between an unlocked position 208(B) at which the lock lever 208 is positioned inside the outline of the. Patrone cover 207 and a locked position 208(A) at which the lock lever 208 extends beyond the outline of the Patrone cover, is supported with an axis member by the Patrone cover 207 as shown in FIG. 31.

A lock knob 209, which is secured to the lock lever 208 with a screw 217, is supported with the screw 217 on the Patrone cover, so that the lock knob 209 can rotate freely. When the Patrone cover 207 lies at the blocking position, the lock knob 209 is turned to pivot the lock lever 208. The lock lever 208 then gets over a click stop 207a formed on the Patrone cover 207, and reaches the locking position 208(A) in FIG. 31. The lock lever 208 is locked in the casing 202, disabling the Patrone cover 207 from opening. The lock lever 208 is turned to get over the click stop 207a on the Patrone cover 207 and set at the unlocking position 208(B). The lock lever 208 is unlocked from the casing 202, enabling the Patrone cover 207 to open. An R gear 228, which holds an R fork 229 designed for film rewind and engages with the film take-up axis of the Patrone 25, is supported with an axis member by the Patrone cover 207 so that the R gear 228 can rotate to advance or withdraw the R fork 229. When the Patrone cover 207 is closed, the R gear 228 engages a planetary gear 227b of a film rewind driving system which will be described later.

A film feed driving system and a film rewind driving system as those shown in FIG. 32 are installed as a film drive in this camera. A drive motor 220 for the driving systems is fixed to the camera body 201. The forward or reverse rotation, or stop of the drive motor 220 is controlled by the control circuit shown in FIG. 12 via the driving circuit 62. A pinion gear 221 is attached to the output axis of the motor 220 and connected to a known planetary clutching mechanism via a reduction gear 222.

The planetary clutching mechanism consists of a driving gear 223a, a sun gear 223b, and a planetary gear 223c. The planetary clutching mechanism can transmit driving force selectively to the gear of the spool 4 in the film feed driving system and a film rewind gear array 224 in the film rewind driving system depending on the rotating direction of the motor 220. The planetary gear 223c revolves between an engaging position 223c(A) and another (non-engaging position) 223c(B).

The film rewind driving system comprises the film rewind gear array 224, an intermediate gear 226, and a film rewind planetary gear mechanism serving as a clutch means. The rotation of the film rewind gear array 224 is transmitted to the R gear 228, which rewinds the film 21 (See FIG. 1). The planetary gear mechanism is, as shown in FIG. 31, composed of a sun gear 227a, a planetary gear 227b, a carrier 227c, and a constrainer spring 227e.

The intermediate gear 226 is supported with an axis member by the camera body 201 so that it can rotate freely, and engages with the gear array 224 through the planetary gear mechanism. The sun gear 227a is supported with an axis member by the camera body 201 so that it can rotate freely, and engages intermediate gear 226. The carrier 227c is supported coaxially with the sun gear 227a so that it can rotate freely. The planetary gear 227b is supported with an axis member by the distal part of the carrier 227 so that it can rotate freely, and engages sun gear 227a. The carrier 227c is constrained to rotate clockwise in FIG. 31 by the constrainer spring 227e. A projection 227d is formed in the distal part of the carrier 227c and extending in the axial direction of the planetary gear 227b.

The projection 227d is opposed to the lock lever 208 on the Patrone cover 207 that is closed. When the lock lever 208 is turned to the locking position 208(A), the projection is pressed against the lock lever 208. The planetary gear 227b then engages with the R gear 228 on the Patrone cover 207. When the lock lever 228 is turned counterclockwise in FIG. 31 and set at the unlocking position 208(B), the carrier 227c rotates clockwise due to the constrainer spring 227e and then hits a stopper 201d resting on the camera body 201. This movement causes the planetary gear 227b to disengage from the R gear 228. In this state, the Patrone cover 207 can be opened. While the Patrone cover 207 is being opened, the carrier 227c and planetary gear 227b are located so as not to interfere with the Patrone cover 207.

When the Patrone 25 is to be mounted, as shown in FIG. 30, the Patrone cover 207 is open. At this time, the carrier 227c and planetary gear 227b have withdrawn for fear that the planetary gear 227b might engage with the R gear 228 due to the constrained force of the constrainer spring 227e, and will not interfere with the mounting of a Patrone 25.

After the Patrone 25 has been mounted, the Patrone cover 207 is closed. At this time, the carrier 227c and planetary gear 227b will not interfere with the Patrone cover 207 and R gear 228. The lock knob 209 is driven with the Patrone cover 207 held closed, so that the lock lever 208 will turn from the unlocking position 208(B) to the locking position 208(A). With the turning of lever 208, the distal part of the lock lever 208 comes oust of the outline of the Patrone cover 207 and lies in the inner wall of the casing 202. The Patrone cover 207 is thus held closed. At the same time, the distal part of the lock lever 208 abuts the projection 227d of the carrier 227c, and allows the carrier 227c to rotate counterclockwise in FIG. 31 against the constrainer spring 227e. This rotation causes the planetary gear 227b and R gear 228 to engage each other.

The Patrone cover 207 has a waterproof packing 210a at the junction with the casing 202 and a waterproof packing 210b at the junction with the lock knob 209. These packings are united with the Patrone cover 107. When the Patrone cover 207 is closed, the packings 210a and 210b are pressed to the casing 202 and Patrone cover 207 respectively. Thus, water is shut out tightly. The packing 210b lies between the Patrone cover 207 and lock knob 209 and shuts out water tightly. The other junctions with the casing, which are not shown, are sealed using a known art such as O-rings, packings, ultrasonic welding, or adhesion, thus shutting out water tightly.

Figure 33:
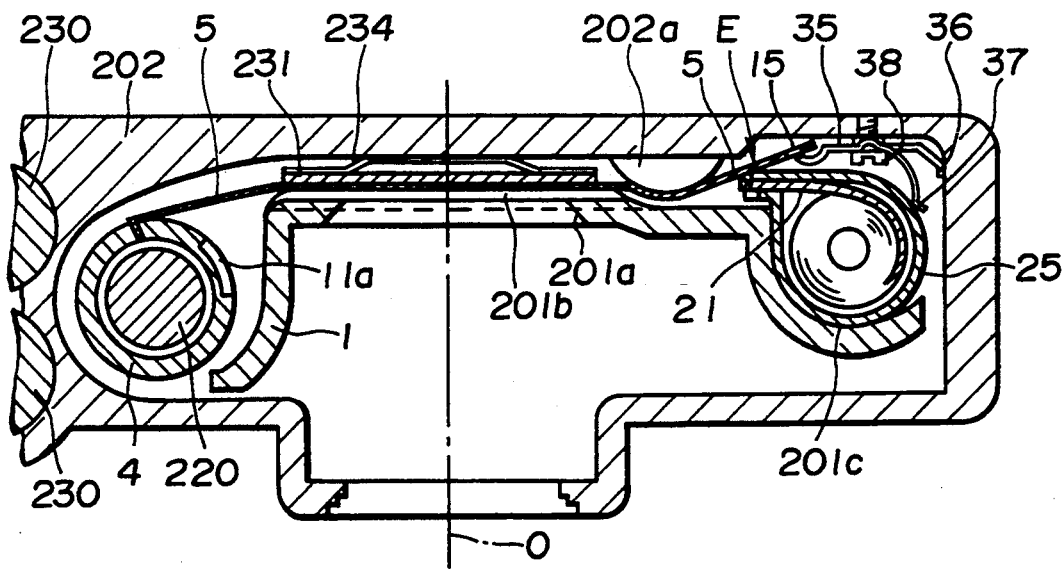
FIG. 33 is a cross-sectional view showing a camera body of the camera of the fourth embodiment in a state in which a Patrone is mounted.

FIG. 33 is a cross-sectional view showing a film feed path in the camera of this embodiment in a state that the Patrone 25 is mounted. In the camera of the fourth embodiment, the components of the film feed system designed for pulling out, winding, or rewinding film are identical to those in the camera of the first embodiment.

In the state that film is wound or unloaded; that is, the state that the pull-out sheet 5 (See FIG. 2) is wound up and then the film 21 is taken up by the spool 4, which is shown in the drawings except FIG. 33, and in the state that photography is completed and then the Patrone 25 is demounted, the film feed path looks like the cross-sectional views of FIGS. 8 and 9 employed for describing the first embodiment. FIGS. 8 and 9 will therefore be referenced to describe the states that film is wound and unloaded in the fourth embodiment. FIG. 7 employed for describing the First embodiment will be referenced as an enlarged view of FIG. 33 showing an area E or an area in which the pull-out sheet 5 is locked.

The drive motor 220 is fixed to the camera body 201. The spool 4 is, as shown in FIG. 33, located on the outer circumference of the motor 220 and supported with an axis by the camera body 201 so that it can rotate freely. The casing 202 behind the Patrone chamber 201c supports the Patrone presser 37 via the stepped screw 38, so that the patrone presser 37 can swing freely. The Patrone presser 37 is, as described in conjunction with FIGS. 6, 8, and 9 showing the first embodiment, made of an elastic metallic plate. The Patrone presser assembly 37 is a unitary member for contacting the Patrone 25, the presser 35 that can be fitted into the presser hole 15 of the pull-out sheet 5, and the spring 36 that is in contact with the casing 202. The Patrone presser 37 is constrained to swing clockwise in FIG. 33 due to the action of spring 36. The other capabilities of the Patrone presser 37 are identical to those described in conjunction with FIGS. 8 and 9 which description will therefore be omitted.

The movements for mounting or demounting a Patrone, or feeding film made in the camera of this embodiment having the aforesaid components will be described. When the Patrone 25 is to be mounted in the camera, first, the lock knob 209 is rotated to the unlocking position. The lock lever 208 then turns to the unlocking position 208(B), and the carrier 227c withdraws from the R gear 28 due to the constrainer spring 227e. The patrone cover 207 is thus enabled to open. At this time, the pull-out sheet 5 and others are placed in the state shown in FIG. 9. The Patrone presser 37 swings clockwise due to the action of spring 36. The presser 35 that is the left part of the Patrone presser assembly 37 is fitted into the presser hole 15 of the pull-out sheet 5, which prevents advancement of the pull-out sheet 5.

The Patrone cover 207 is then opened, and the Patrone 25 is mounted in the camera as shown in FIG. 29. In this stage, the carrier 227c and planetary gear 227b have already withdrawn so that the carrier 227c will lie at the withdrawal position 227b(B) (See FIG. 31). The carrier 227c and planetary gear 227b will therefore not interfere with the Patrone 25. When a Patrone is mounted, the pull-out sheet 5 is positioned as shown in FIG. 9. The pull-out sheet 5 will therefore not be folded in because of Patrone 25.

After the Patrone 25 has been inserted, the Patrone cover 207 is closed and the lock knob 209 is rotated to the locking position. The lock lever 208 then presses the projection 227d of the carrier 227c. This causes the planetary gear 227b to move to the engagement position 227b(A). The planetary gear 227b then engages with the R gear 228 (See FIG. 31). The lock lever 208 pushes through the click stop 207a and stands still at the locking position 208(A). The lock lever 208 is then locked in the casing 202, which holds the Patrone cover 207 closed and disables the Patrone cover 207 from opening.

A switch or the Patrone cover open/close detecting means 64 in FIG. 12 detects the state transition of the Patrone cover 207 from the opened state to the closed state. The control circuit 61 allows the motor 220 to rotate clockwise in FIG. 32. The planetary clutch engages with the gear of the spool 4, causing the spool 4 to rotate in the film wind direction. The rotation of the spool 4 causes the pull-out sheet 5 to move. When the claw 13 on the sheet 5 is fitted into the locking hole 24 in the film 21, the film 21 is unloaded from the Patrone 25 and taken up by the spool 4 (See FIG. 8).

After photography is completed, the control circuit 61 allows the motor 220 to rotate counterclockwise in FIG. 32. This causes the planetary gear 223c of the planetary clutch to engage with the film rewind gear array 224. The R gear 228 then rotates. The R fork 229 causes the film take-up axis of the Patrone 25 to rotate, which rewinds the film 21. When the rewound film 21 comes to an end, the pull-out sheet 5 rides on the inclined plane 27 (See FIG. 1) of the Patrone 25. The claw 13 is almost released from the hole in the film 21 (See FIG. 33). The film feed detecting means 63 in FIG. 12 detects the fact that the perforations 22 in the film 21 (See FIG. 1) do not move. The control circuit 61 stops the drive motor 20.

Thereafter, the lock knob 209 on the Patrone cover 207 is used to turn the lock lever 208 from the locking position 208(A) to the unlocking position 208(B) (See FIG. 31). This causes the lock lever 208 to hide in the Patrone cover 207. The Patrone cover 207 is then unlocked, and the carrier 227c and planetary gear 227b withdraw. Thereafter, the Patrone cover 207 is opened to demount the Patrone 25. With the movement of the Patrone 25, the claw 13 on the pull-out sheet 5 comes out of the locking hole 24 in the film 21 and rides on the flat area because of its shape of a circular arc (See FIG. 3A). The Patrone 25 is then extracted. In the meantime, the Patrone 25 is released from the Patrone presser 37. The Patrone presser 37 swings clockwise to the position shown in FIG. 9, and the sheet presser 35 is fitted into the presser hole 15 (See FIG. 9) of the pull-out sheet 5. The sheet 5 is thus held apart from the Patrone 25. The Patrone 25 is then demounted from the camera. A series of movements are thus completed.

As described above, in the camera of the fourth embodiment, the elaborated structures of the Patrone 25, film 21, and pull-out sheet 5 provide a simple mechanism to pull out and wind the film 21. Once the Patrone 25 containing the film 21, whose distal part is not tongued and exposed to the outside; that is, not formed as a leader, is inserted into the Patrone chamber, the film 21 is automatically pulled out and taken up reliably.

Interlocked with the lock lever 208 on the Patrone cover 207, the planetary gear 227b is advanced or withdrawn by the simple mechanism. This eliminates the fear that when the Patrone cover 207 is opened or closed, a gear of the film rewind driving system may be damaged. The film wind and film rewind driving systems are gathered in the lower part of the camera body 201, whereby, unlike those in a conventional camera, a viewfinder, an auto-focusing unit, and a strobe will not overlap the driving systems. The spaces in the camera are therefore utilized efficiently. The camera can therefore be designed compactly.

Interlocked with the Patrone cover, the film feed driving force transmission means and driving means are coupled to each other. This eliminates the fear that when the Patrone cover is open, a user may touch a Patrone or a film drive carelessly. This results in improved reliability, better appearance, and other outstanding advantages.

Since the Patrone cover 207 is formed on the bottom of the camera, the camera enjoys beautiful appearance. The Patrone cover 207 is small in size. The packings are reliably compressed with less deflection or deformation, which leads to improved waterproofness.

What is claimed is:

1. A camera in which light reaching a rear of a camera body through an aperture can be metered to perform various kinds of regulation without interference, including:
    a film pull-out sheet having a transparent part for transmitting light that has passed through said aperture, said film pull-out sheet having one end thereof fixed to a film take-up spool, said transparent part being located in an area facing said aperture by substantially overlapping said aperture when the camera is in an initial state, the other end thereof extending to a Patrone chamber said other end having an aperture between longitudinal edges thereof when the camera performs film winding, engages a distal end of said film for winding said film about said spool with a force which is uniform across a width of the film; and
    said film pull-out sheet transmitting light passing through said aperture to said rear of said camera body.

2. A camera according to claim 1, wherein said film pull-out sheet is formed with a transparent member that includes said transparent part.

3. A camera according to claim 2, wherein said transparent member transmits at least 50% of visible light therethrough.

4. A camera according to claim 3, wherein said transparent member is one of a cellulose triacetate (CAT) film and a polyethylene terephthalate (PET) film.

5. A camera according to claim 3, wherein said transparent member is one of a cellulose triacetate (CAT) film and a polyethylene terephthalate (PET) film that is attached to said film pull-out sheet and that, when the camera is in the initial state, faces the aperture.

6. A camera according to claim 3, wherein said transparent member is formed by cutting out at least a specified portion of said film pull-out sheet such that, when the camera is in the initial state, said specified portion faces the aperture.

7. A camera according to claim 1, wherein said transparent part formed in said film pull-out sheet is a hole in an area thereof substantially aligned with said aperture and being cut out so that light reaches said rear of said camera body.

8. A camera according to claim 1, 2, or 7, wherein the distal part of a film used for said camera has a coupling means, which is coupled with another end of said film pull-out sheet, and bosses for preventing the film from being pulled into the Patrone, and said film pull-out sheet has swell-prevention means for accommodating said bosses and coupling means when said film pull-out sheet and film are taken up by the take-up spool.

9. A camera according to claim 8, wherein said swell-prevention means are holes bored along a zone, which is provided to transmit light passing through said aperture to the rear of said camera body.

10. A camera according to claim 1, wherein said camera body includes a Patrone cover that provides a lid for releasably closing said Patrone chamber, said Patrone cover having an engaging member for engaging and rotatably supporting a Patrone, and a film wind gear that, when said Patrone cover is closed, said film wind gear engages a film rewind gear array arranged in said camera body for rotating said engaging member.

11. A camera according to claim 10, wherein a gear, which is located in said camera body and engages a gear of a film rewind gear array which is located in a side of the camera body and engages said film winding gear, has an elastic means on a rotary axis of said gear and is slidable in a direction of an axis of rotation.

12. A camera in which light reaching a rear of a camera body can be metered to perform various kinds of regulation without interference, including:
    a film pull-out sheet that, when the camera is in an initial state, has one end thereof fixed to a film take-up spool and the other end thereof extended to a Patrone chamber and is provided with an aperture between the ends thereof, and that when the camera performs film wind, winds film about the spool;
    said film pull-out sheet transmitting light passing through said aperture to a rear of said camera body; and
    a zone formed with said transparent member having at least an area that, when the camera is in the initial state, faces the aperture.

13. A camera in which light reaching a rear of a camera body can be metered to perform various kinds of regulation without interference, including:
    a film pull-out sheet that, when the camera is in an initial state, has one end thereof fixed to a film take-up spool and the other end thereof extended to a Patrone chamber and is provided with an aperture between the ends thereof, and that when the camera performs film wind, winds film about the spool;
    said film pull-out sheet transmitting light passing through said aperture to a rear of said camera body; and
    said Patrone chamber in said camera body having an elastic interlocking member that interlocks with mounting of said Patrone, presses and secures said Patrone, and moves the other end of said film pull-out sheet to a position at which said other end is readily coupled with the film, and that interlocked with the demounting of said Patrone, evacuates said other end of said film pull-out sheet to a location rearward of the aperture.

14. A camera for pulling out film from a Patrone mounted in a Patrone port in a camera body and winding up the film, including:
an aperture opening blocking means movable between a closed and an open position for selectively blocking and exposing an aperture opening when respectively in said closed and said open position; and
a film pull-out sheet having one end thereof fixed to a film take-up spool in said camera body, and having another film engaging end for pulling film from a Patrone responsive to operation of said film take-up spool:
releasable holding means for releasably holding said film engaging means against said aperture opening blocking means enabling said film engaging end to move together with said blocking means and to move said film pulling end toward said Patrone port when said aperture opening blocking means is in said closed position, said aperture opening being positioned between the ends of said film pull-out sheet when said blocking means is in the closed position.

15. A camera according to claim 14 wherein said film engaging end is provided with means for engaging a film in said Patrone chamber preparatory to pulling the film out of said Patrone chamber when said aperture opening blocking means is in the closed position.

16. A camera for pulling out film from a Patrone mounted in a Patrone stowage chamber provided in a camera body and winding up the film, including:
a movable back cover closing means for selectively closing and opening said Patrone stowage chamber and an aperture opening; and
a film pull-out sheet having one end thereof fixed to a film take-up spool in said camera body, and a film engaging end for engaging the film in said Patrone chamber to pull the film out of the Patrone upon operation of the film take-up spool, means for releasably holding said film engaging end on to said back cover closing means to enable the film engaging end of said pull-out sheet to move together with said back cover closing means, said aperture opening being positioned between the ends of said film pull-out sheet when said movable back cover closing means is in the closed position.

17. A camera according to claim 14 or 16, wherein a distal part of a film in said camera has a coupling means, which is coupled with said other end of said film pull-out sheet, and bosses for preventing the film from being pulled into a Patrone, and said film pull-out sheet has swell-prevention means for for accommodating said bosses and coupling means when said film pull-out sheet and film are taken up by said take-up spool.

18. A camera according to claim 17, wherein said swell-prevention means comprise holes bored along a zone through which light passing through the aperture is transmitted to a rear portion of said camera body.

19. A camera according to claim 14 or 16, wherein said camera body includes a Patrone cover that provides a lid for said Patrone chamber, and said Patrone cover has an engaging axis that engages a Patrone, and a rotary gear that, when said Patrone cover is closed, engages a film rewind gear array arranged in said camera a body and rotates said engaging axis.

20. A camera according to claim 19, wherein a gear of said gear array, which engages said rotary gear, can move in a direction of a rotation axis thereof and is constrained to move in a direction for engaging said rotary gear.

21. A camera according to claim 16 wherein said means for releasably holding said film engaging end positions of said film engaging end adjacent to said Patrone stowage chamber engages a film preparatory to pull-out of the film from the Patrone stowage chamber.

22. A camera that, when a Patrone is mounted along an engaging axis provided in a Patrone stowage chamber of a camera body, pulls out film from the Patrone and then winds up the film, including:
a movable aperture opening blocking means that selectively blocks and exposes an aperture opening; and
a film pull-out sheet having one end thereof fixed to a film take-up spool in said camera body and another end thereof extended to the Patrone chamber, said aperture opening being positioned between the ends thereof; and
wherein releasable holding means holds the other end of said film pull-out sheet onto said aperture blocking means so that the other end of said film pull-out sheet moves together with said aperture opening blocking means.

23. A camera that, when a Patrone is mounted along an engaging axis provided in a Patrone stowage chamber of a camera body, pulls out film from the Patrone and then winds up the film, said camera including:
a movable aperture opening blocking means for selectively blocking and exposing an aperture opening; and
a film pull-out sheet having one end thereof fixed to a film take-up spool in said camera body and another end thereof extended to the Patrone chamber, said aperture opening being positioned between the ends thereof,
said Patrone stowage chamber including a Patrone cover movable between a position at which the Patrone cover is withdrawn from said camera body and a position at which the Patrone cover is locked in said camera body, and having an elastic interlocking means that;
after a Patrone is mounted in said Patrone stowage chamber, is interlocked with the movement of said Patrone cover to the position at which said Patrone cover is locked in said camera body, presses against and secures said Patrone and moves the other end of said film pull-out sheet to a position at which said other end is readily coupled with said film, and that, when interlocked with the movement of said Patrone cover to a position at which said Patrone cover is withdrawn from said camera body, moves the other end of said film pull-out sheet to a position behind the aperture.

24. A camera that, when a Patrone is mounted along an engaging axis in a Patrone stowage chamber of a camera body, pulls out film from the Patrone and winds up the film, said camera including:
movable opening blocking means for selectively blocking and exposing an aperture opening and said Patrone stowage chamber; and
a film pull-out sheet having one end thereof fixed to a film take-up spool in said camera body and another end thereof extended to said Patrone stowage chamber, with said aperture opening being positioned between the ends thereof, said camera further including an elastic interlocking member formed as part of said opening blocking means and adjoins the other end of said film pull-out sheet, and that, when a Patrone is mounted in said Patrone stowage chamber, interlocked with movement of said opening blocking means to an opening blocking position, presses against and secures said Patrone and moves the other end of said film pull-out sheet to a position at which said other end is readily coupled with said film.

25. A camera according to claim 24, wherein releasable holding means holds the other end of said film pull-out sheet onto said aperture blocking means so that said film pull-out sheet moves together with said aperture opening blocking means.

26. A camera having a camera body in which a Patrone cover mounting member for use in mounting a Patrone can be moved between a position at which the mounting member is withdrawn from an opening in the camera body and a position at which the mounting member is put to use by insertion into the camera body to cover said opening, including:

a spool axis driving means supported by said mounting member to rotate freely, and, when said mounting member lies at the position at which said mounting member is withdrawn, is decoupled from a driving force transmission means, located in said camera body for winding and rewinding film, by transmitting driving force to a spool axis in the Patrone, and, wherein, when said mounting member reaches a position at which said mounting member is put to use, a gear in said driving force transmission means and a gear in a spool axis driving means attached to said mounting member are coupled to each other in a direction perpendicular to said spool axis so that their rotation axes are parallel with each other, and, wherein film stowed in a mounted Patrone is pulled out of said Patrone by means of a film pull-out sheet having one end thereof fixed to a film take-up spool in said camera body and another end extended to a Patrone chamber, with an aperture opening arranged between the ends of said film pull-out sheet, said film pull-out sheet having a transparent part for transmitting light passing through an aperture; and wherein said camera body has an elastic interlocking member interlocked with said Patrone mounting member and being moved to a position at which said mounting member is locked in said camera body, to press against and secure said Patrone and moves the other end of said film pull-out sheet to a position at which said other end is readily coupled with film, and being moved to a position with the movement of said mounting member to a position at which said Patrone member is withdrawn from said camera body, to move said other end of said film pull-out sheet to a position behind said aperture opening.

* * * * *